(12) United States Patent
Rapp et al.

(10) Patent No.: US 11,287,352 B2
(45) Date of Patent: Mar. 29, 2022

(54) OTDR WITH INCREASED PRECISION AND REDUCED DEAD ZONE USING SUPERPOSITION OF PULSES WITH VARYING CLOCK SIGNAL DELAY

(71) Applicant: Xieon Networks S.à.r.l., Luxembourg (LU)

(72) Inventors: Lutz Rapp, Deisenhofen (DE); Nuno Renato Duarte Pereira, Moita (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/093,038

(22) PCT Filed: May 24, 2017

(86) PCT No.: PCT/EP2017/062551
§ 371 (c)(1),
(2) Date: Oct. 11, 2018

(87) PCT Pub. No.: WO2017/202916
PCT Pub. Date: Nov. 30, 2017

(65) Prior Publication Data
US 2019/0128775 A1    May 2, 2019

(30) Foreign Application Priority Data

May 27, 2016  (EP) .................................... 16171796

(51) Int. Cl.
*G01M 11/00* (2006.01)
(52) U.S. Cl.
CPC .... *G01M 11/3118* (2013.01); *G01M 11/3145* (2013.01)

(58) Field of Classification Search
CPC .................... G01M 11/3118; G01M 11/3145
See application file for complete search history.

(56) References Cited

U.S. PATENT DOCUMENTS 5,021,784 A  *  6/1991  Groeneveld ........ H03M 1/0648
                                                       341/120
5,353,110 A    10/1994  Jones
(Continued)

FOREIGN PATENT DOCUMENTS

| GB | 2163315 A | 2/1986 |
| WO | 2011/147030 A1 | 12/2011 |
| WO | 2016/073579 A1 | 5/2016 |

OTHER PUBLICATIONS

International Search Report and Written Opinion, PCT/EP2017/062551, dated Aug. 8, 2017, 15 pages.
(Continued)

*Primary Examiner* — Violeta A Prieto

(57) ABSTRACT

A method for determining the position of an irregularity in an optical transmission fiber using an optical time domain reflectometer, the method comprising the steps of emitting a succession of sampling light pulses into the optical transmission fiber, detecting reflected light pulses resulting from the reflection of the sampling light pulses at the irregularity in the optical transmission fiber and generating corresponding time-dependent detection signals, wherein different delays are associated with detection signals corresponding to different sampling light pulses, obtaining a combined signal from the detection signals, and analyzing the combined signal for determining the position of the irregularity in the optical transmission fiber with respect to the optical time domain reflectometer, wherein the combined signal corresponds to a superposition of the detection signals.

27 Claims, 13 Drawing Sheets

(56) References Cited

U.S. PATENT DOCUMENTS

| | | | |
|---|---|---|---|
| 5,365,328 A * | 11/1994 | Anderson | G01M 11/3109 356/73.1 |
| 5,754,284 A | 5/1998 | Leblanc et al. | |
| 6,594,004 B1 * | 7/2003 | Makita | G01M 11/3145 356/73.1 |
| 2005/0110979 A1 | 5/2005 | Harres | |
| 2013/0088718 A1 * | 4/2013 | Perron | H04B 10/071 356/445 |
| 2014/0037285 A1 * | 2/2014 | Perron | G01M 11/3127 398/21 |
| 2014/0146312 A1 | 5/2014 | Perron et al. | |
| 2016/0013860 A1 * | 1/2016 | Perron | G01M 11/3136 398/16 |
| 2016/0277101 A1 * | 9/2016 | Jiang | G01M 11/00 |
| 2017/0134033 A1 * | 5/2017 | de Figueiredo | H03M 1/1215 |

OTHER PUBLICATIONS

Muanenda, Y. et al., "A Cost-Effective Distributed Acoustic Sensor Using a Commercial Off-the-Shelf DFB Laser and Direct Detection Phase-OTDR," IEEE Photonics Journal, IEEE, USA, vol. 8 (1):1-10 (2016).

Communication pursuant to Article 94(3) EPC, dated Feb. 26, 2020, for European counterpart Application No. EP 17 725 591.6-1001 (Applicant Xieon Networks S.a.r.l.).

* cited by examiner

7a

7b

OTDR WITH INCREASED PRECISION AND REDUCED DEAD ZONE USING SUPERPOSITION OF PULSES WITH VARYING CLOCK SIGNAL DELAY

RELATED APPLICATIONS

This application is a 35 U.S.C. 371 national stage filing of International Application No. PCT/EP2017/062551, filed on May 24, 2017, which claims priority to European Patent Application No. 16171796.2, filed on May 27, 2016. The entire contents of these applications are incorporated herein by reference in their entirety.

FIELD OF THE INVENTION

The present invention is in the field of fiber-optic communication. In particular, the present invention relates to a method for determining the position of an irregularity in an optical transmission fiber using an optical time domain reflectometer (OTDR) and a correspondingly configured OTDR for determining the position of an irregularity in an optical transmission fiber.

BACKGROUND OF THE INVENTION

OTDRs are used in the field of fiber-optic communication to gain insight into the main optical parameters of an optical transmission fiber, like information regarding fiber attenuation, and to detect impairments or irregularities, like deteriorated connectors or fiber breakages. An OTDR typically comprises a light source and a detector. The light source sends an optical pulse into the fiber, which is then partly reflected back by the fiber itself or by an irregularity in the fiber. The reflected optical pulse is then received by the detector and analyzed so as to extract characterizing information about the optical transmission fiber. For example, assuming knowledge of the speed of light in the fiber, a measure of the time elapsed between the emission of an optical pulse by the light source and the detection of the reflected pulse at the detector can be straightforwardly converted into information about the distance between the OTDR and the corresponding reflection point. Typically, when an optical pulse has entirely returned to the detector, a subsequent pulse is sent out and the procedure is repeated a number of times over a desired acquisition time. Many acquisitions can be performed and averaged so as to achieve a more reliable picture of the optical transmission fiber.

There are two types of reflection phenomena relevant to OTDRs. On the one hand, no optical transmission fiber provides perfect absorption-free transmission. Reflection and absorption by impurities inside the fiber cause the light to be redirected in different directions creating both signal attenuation and backscattering, known as Rayleigh backscattering. Rayleigh backscattering can be used to calculate the level of attenuation in the fiber as a function of fiber distance. Since fiber attenuation typically presents an exponential behavior, it is usually expressed in dB/km.

On the other hand, when a light pulse travelling in the fiber hits an abrupt medium transition, like for example in a connector, a mechanical splice or a fiber breakage, the consequent abrupt change in the index of refraction causes a large amount of light to be reflected back. This phenomenon is known as Fresnel reflection and can be thousands of times more significant than Rayleigh backscattering. In terms of OTDR, Fresnel reflection phenomena leave a characteristic trace in the form of a peak signal, corresponding to an abrupt increment in the amount of reflected light.

As commonly known in the art, when a high amount of light is reflected back and received at the detector, the detector is temporarily blinded or saturated. Further, due to absorption, chromatic dispersion, and/or backscattering in the fiber, not all of the reflected light will arrive at the detector as a pulse having the same form as the pulse originally sent. Instead, a main reflection peak will be detected and a so-called diffusion tail will follow while the levels of detected reflected light progressively return to base level. Subsequent reflection events may only be detected once the detector is fully operative again after saturation and after the amount of detected reflected light is back to base level. This effectively takes some time and the period of time during which the detector cannot detect reflection events translates into a spatial range of the fiber in which a reflection point would not be seen by the OTDR. This spatial range is known as the dead zone. Having the shortest-possible dead zone is a very relevant issue in the field of fiber-optic communication.

For example, when testing in the premises of dense optical networks, dead zones which are not short enough might lead to various junction points or connectors being missed and not identified by the technicians, which makes it harder to locate potential problems. Further, the accuracy when determining the position of a fiber breakage is crucial for the feasibility of the reparation works, since many optical transmission fibers are installed underground or undersea. Manufacturers hence usually struggle to provide fast recovering detectors able to provide for shorter dead zones.

Dead zones are also influenced by the width of the light pulses. Longer light pulses result in longer dead zones, since reflected light corresponding to long pulses is received at the detector over a longer detection time. Instead, a short pulse width implies a shorter dead zone. However, having too short pulses can result in the inability of the pulses to be reflected at an irregularity and correctly detected due to the smaller number of photons.

Further, the ability of an OTDR to determine the position of an irregularity in the fiber also relies on its sampling resolution. Ultimately, electronic devices have a limited time resolution and extract discrete information from measurements, related to samples obtained at timely spaced sampling points. The time elapsed between successive sampling points is referred to herein as the sampling period. Effectively, the spatial accuracy with which an irregularity can be detected is half the product of the sampling period and the speed of light in the fiber. Hence this parameter is crucial, as it defines the spatial precision with which a reflection point can be located in the fiber. In the case of a long sampling period, reflection events are more likely to be missed if the corresponding reflected light happens to arrive at the detector between sampling points.

In view of the above, manufacturers try to provide OTDRs using high-speed hardware components with the ability to generate and detect very short pulses. This however greatly increases the costs and the level of technical involvement of the corresponding devices. Thus, there is room for technical improvements in the determination of the position of irregularities in an optical transmission fiber using an OTDR.

SUMMARY OF THE INVENTION

The problem underlying the invention is to provide means and a method for determining the position of an irregularity in an optical transmission fiber. This problem is solved by a method for determining the position of an irregularity in an optical transmission fiber using an optical time domain reflectometer according to claim number 1 and an optical time reflectometer according to claim 23. Herein, an irregularity is understood to have a broad meaning and covers any kind of abrupt medium change resulting in an abrupt modification of the index of refraction of the optical transmission fiber due to, for instance, a breakage, a defect, connections between different types of fibers, an interruption or any other kind of irregularity. Preferable embodiments of the invention are described in the dependent claims.

The method of the invention comprises a first step of emitting a succession of sampling light pulses into the optical transmission fiber Herein, a "light pulse" is understood to have a broad meaning and covers any kind of optical signal displaying for a finite period of time an amplitude variation with respect to a zero value.

The method further comprises a step of detecting reflected light pulses resulting from the reflection of the sampling light pulses at an irregularity in the optical transmission fiber and in generating corresponding time-dependent detection signals, wherein different delays are associated with detection signals corresponding to different sampling light pulses. When a sampling light pulse reaches the irregularity, the abrupt change in the index of refraction with respect to that of the optical transmission fiber causes a considerable amount of light to be reflected back due to Fresnel reflection. As known to persons skilled in the art, Fresnel reflection can be thousands of times more significant than the constant low level Rayleigh backscattering created by the optical transmission fiber. Said back-reflected light of a given sampling light pulse constitutes a corresponding reflected light pulse resulting from the reflection of the sampling light pulse at the irregularity. The reflected light pulse is detected and in response thereto, a corresponding time-dependent detection signal is generated. Preferably, the time-dependent detection signal is an electrical signal, which typically has an amplitude proportional to the amplitude of the corresponding reflected light pulse.

Different detection signals, corresponding to different sampling light pulses, that is, generated upon the detection of the reflected light pulses resulting from said sampling light pulses, are associated with different delays. Herein, a delay is meant to be any kind of delay between more than one detection signal, be it really measured or virtually introduced. The sampling light pulses are emitted in a succession, which means that the sampling light pulses are timely ordered and that one pulse is emitted at a time. One way of associating different detection signals with different delays may consist in emitting a succession of sampling light pulses, wherein a detection signal is generated for each sampling light pulse, and wherein virtual delays, different for each detection signal, are associated to the corresponding detection signals. The aforementioned virtual delay may be a delay relative to a clock signal and/or to trigger points, that may be virtually generated. Herein, a clock signal is meant to be any kind of optical or electronic signal with which a regular and stable time unit can be defined such that a timescale is provided. The clock signal may provide a regular and stable timescale which allows referencing the delays to evenly spaced clock signal points, separated by regular clock signal cycles.

Alternatively, the sampling light pulses may be emitted with different delays relative to a clock signal, such that the corresponding detection signals automatically have different delays with respect to the clock signal.

The method further comprises a step of obtaining a combined signal from the detection signals. According to the invention, each detection signal corresponds to a reflected light pulse, which in turn corresponds to the reflection of a sampling light pulse, and is associated with a different delay. Hence the combined signal corresponds to a superposition of detection signals, to which different delays are associated. A further method step consists in analyzing the combined signal for determining the position of the irregularity in the optical transmission fiber with respect to the OTDR. Typically, this is done by relating information about the speed of light within the optical transmission fiber to the time lapse observed between the emission of a sampling light pulse and the measurement of the corresponding detection signal. According to the invention, however, not the individual detection signals are analyzed but the combined signal resulting from a superposition thereof.

Consequently, the position of the irregularity in the optical transmission fiber can be determined with precision even using relatively long sampling light pulses with relative low peak powers and a receiver with relatively low time resolution. A higher precision is mainly required in the analysis of the combined signal. Thus, advantageously, the accuracy for determining the position of the irregularity in the optical transmission fiber does not directly depend on the sampling period or the pulse width. Thereby, high resolution in the detection of the position of the irregularity can be achieved without necessarily resorting to costly and technically involved high-speed hardware. Further, since the position of the irregularity is determined from the combined signal, not by the individual detection signals, the longer lengths of the pulses—as compared to conventional methods for determining the position of an irregularity in an optical transmission system—do not result in a longer dead zone.

In addition, the accuracy with which the position of an irregularity in an optical transmission fiber can be determined using an existing OTDR, configured to emit sampling light pulses of given characteristics according to the hardware specifications, can be improved by means of the method according to the invention. Since the method does not rely on hardware specifications for achieving a better level of precision, but rather on the way that detection signals are handled, the time resolution of an existing OTDR with given hardware components may be improved by configuring said OTDR to implement the method of the invention. The resulting level of precision shall then outperform that obtained by conventional OTDR detection methods relying on the limitations imposed by the corresponding hardware specifications.

In addition, the method of the invention allows configuring existing optical equipment, which might originally have been designed for purposes other than those of an OTDR, for reliably determining the position of an irregularity in an optical transmission fiber as described above. Since the invention provides a method for accurately determining the position of such an irregularity without relying on the time resolution of the hardware components regarding individual light pulses, optical equipment designed for fulfilling functions other than those than an OTDR, and hence not having a good time resolution regarding individual light pulses, may satisfactorily be reconfigured into a system suitable for determining the position of an irregularity in an optical transmission fiber according to the method of the invention. This may be applied, for example, to Raman pumping devices, whose optical supervisory channel may then be used for transmitting light pulses for the purposes of determining the position of an irregularity.

Further, the possibility of using relatively long sampling light pulses leads to detection signals which are less prone to measurement errors due to bandwidth limitations or to generator jitter problems and offers the possibility to test longer portions of the optical transmission fiber with a given OTDR. In addition, the dead zone of an existing OTDR can be reduced by means of the invention, since it is no longer limited by the speed of the hardware components thereof. In fact, by determining the location of the irregularity using the combined signal, portions of the optical transmission fiber can be explored which would typically remain within the dead zone of a conventional OTDR.

According to preferred embodiments of the invention, the method further comprises a step of measuring a calibration signal by performing the above steps, wherein the reflected light pulses result from the reflection of the sampling light pulses at a test irregularity and the calibration signal is obtained as the resulting combined signal, and wherein the test irregularity is an irregularity located at a known distance from the OTDR.

The test irregularity may be comprised within the OTDR, preferably being a connection port of the OTDR configured for connecting the OTDR to an optical transmission fiber. However, the test irregularity might be any other irregularity located at a known distance, like a network unit of reference or any optical component located at a known distance from the OTDR.

Since the distance between the test irregularity and the OTDR is known, the calibration signal provides a reference against which future combined signals may be compared. This way, a single reference is provided against which any subsequently obtained combined signals can be compared so as to determine the position of the irregularity in the optical transmission fiber.

According to preferred embodiments of the invention, the step of obtaining a calibration signal is carried out when starting operation of the OTDR. Typically, the operation of the OTDR is started once it has been connected to an optical transmission fiber, such that the calibration signal can take into account information related to fiber dependent effects, such as the level of fiber attenuation or the change in the refraction index between a connection port of the OTDR and a given optical transmission fiber. Alternatively or additionally, the calibration signal can be obtained during manufacturing of the OTDR.

Obtaining the calibration signal may further involve the comparison thereof to stored data, comprising for example simulated combined signals for different properties of the optical transmission fiber. Then, information related to fiber dependent effects can be inferred from the comparison. For example, a calibration signal obtained when starting operation of the OTDR may be compared with stored data containing simulated combined signals for a known distance to the test irregularity and for different values of the fiber attenuation. The level of actual fiber attenuation can then be determined by pinpointing the simulated combined signal that best resembles the measured calibration signal. This way, the level of fiber attenuation can be determined and subsequently taken into account during the operation of the OTDR, which results in a more accurate determination of the position of irregularities in the optical transmission fiber.

In a preferred embodiment of the invention, the step of analyzing the combined signal comprises comparing the combined signal to the calibration signal to determine a time shift between the combined signal and the calibration signal. The calibration signal is obtained from reflected light pulses resulting from the reflection of sampling light pulses at a test irregularity located at a known distance from the OTDR. The combined signal is obtained from reflected light pulses resulting from the reflection of sampling light pulses at an irregularity located at an unknown distance from the OTDR. The time shift between the combined signal and the calibration signal is due to a difference between the distance between the OTDR and the test irregularity on the one hand and the distance between the OTDR and the irregularity on the other hand. This distance may be computed from the time shift knowing the speed of light in the fiber. Hence a comparison of the combined signal to the calibration signal provides a simple and precise way of determining the position of the irregularity in the optical transmission fiber using the combined signal.

According to preferred embodiments of the invention, the step of analyzing the combined signal further comprises normalizing the amplitude of the combined signal so that it might have the same amplitude as the calibration signal. The test irregularity and the irregularity may have different reflectivities, such that the reflected light pulses reflected at the test irregularity and those reflected at the irregularity may have different amplitudes. Consequently, the amplitude of the calibration signal and the amplitude of the combined signal might differ. Typically, stronger reflection occurs at the test irregularity, which has been designed for reflection purposes, than at the irregularity, such that the combined signal has a smaller maximum amplitude than the calibration signal.

Further, fiber attenuation contributes to a weakening of the reflected light pulses proportional to the distance between the OTDR and the irregularity, such that in the absence of normalization, reflected light pulses reflected at more distant irregularities have smaller amplitudes. By means of the aforementioned normalization of the combined signal, the combined signal may be compared to the calibration signal avoiding the influence of differently strong reflectivities of the irregularities and the influence of fiber attenuation. If the combined signal is normalized to have the same amplitude as a calibration signal, differences between both signals, in particular a time shift, is mainly due to a difference between the distance between the OTDR and the test irregularity and the distance between the OTDR and the irregularity.

In a preferred embodiment of the invention, the time shift between the combined signal and the calibration signal may be determined at a signal point at which the amplitude of the combined signal and the amplitude of the calibration signal has a predetermined value, which predetermined value is between 10% and 90% of the respective maximum signal amplitude, preferably between 30% and 70% and most preferably between 40% and 60%. Further, the time shift between the combined signal and the calibration signal may be determined at a signal point corresponding to the trailing edge of the signals or to the leading edge of the signals. Thereby the common conditions of analysis for different combination signals corresponding to different irregularities is provided, such that possible sources of discrepancies in the results for different combined signals are minimized.

In a preferred embodiment of the invention, the step of analyzing the combined signal comprises fitting the combined signal and/or the calibration signal to an analytic function. Preferably, the analytic function is a polynomial function, like a linear function, although piecewise defined fitting functions, such as triangular functions or the like, might also be used. The fitting may be limited to a part of the combined signal and/or of the calibration signal, for example to a leading edge or to a trailing edge thereof and/or to parts of the signal corresponding to an amplitude within a predetermined range. By means of such a fit, the amount of known data points is not limited to the amount of sampling points, since it can be extended to data points between any sampling points by extrapolation and/or interpolation. Further, the processing and the analysis of the combined signal and/or the calibration signal can be easily implemented by mathematically manipulating the corresponding analytic functions. For example, when determining the signal point at which the amplitude of the combined signal takes a given relative value with respect to the maximum signal amplitude, that signal point can be easily and quickly determined analytically by means of the corresponding analytic function. The same applies to any other mathematical property or parameter of the signals. According to preferred embodiments of the invention, the step of analyzing the combined signal comprises calculating any of the following parameters:

Surface:

$$\sum_{i=1}^{N} c_i \text{ or } \int_{-\infty}^{\infty} c(t) dt;$$

Pulse center:

$$\tau_{center} = \frac{\sum_{i=1}^{N} t_i \cdot c_i}{\sum_{i=1}^{N} c_i} \text{ or } \tau_{center} = \frac{\int_{-\infty}^{\infty} t \cdot c(t) dt}{\int_{-\infty}^{\infty} c(t) dt};$$

Symmetry parameter:

$$S = \frac{4}{\sqrt{2}} \cdot \frac{\tau_{max} - \tau_{center}}{\tau_{RMS}},$$

where $$\tau_{RMS} = \sqrt{\tau_{square} - \tau_{center}^2},$$

with $$\tau_{square} = \frac{\sum_{i=1}^{N} t_i^2 \cdot c_i}{\sum_{i=1}^{N} c_i} \text{ or } \tau_{square} = \frac{\int_{-\infty}^{\infty} t^2 \cdot c(t) dt}{\int_{-\infty}^{\infty} c(t) dt},$$

and $$\tau_{max} = \frac{\sum_{i=1}^{N} t_i \cdot c_i^2}{\sum_{i=1}^{N} c_i^2} \text{ or } \tau_{max} = \frac{\int_{-\infty}^{\infty} t \cdot c(t)^2 dt}{\int_{-\infty}^{\infty} c(t)^2 dt}.$$

wherein c and $c_i$ stand for the combination signal at a time t and $t_i$ respectively, and N stands for a number of sampling points. All integrals are applied to the complete time axis, i.e. from "minus infinity" to "plus infinity". However, in practice the integration is limited to a finite time period or window comprising the combination signal completely. The discrete formulae may be used for discrete values of the combined signal corresponding to a set of sampling points, whereas the continuous formulae may be employed when the combined signal has been fitted to an analytic function. Knowledge of two of the parameters may allow determining unambiguously the fiber attenuation and the position of the irregularity in the optical transmission fiber, as will be shown below in detail (see FIG. 6).

As commonly known in the art, as a consequence of the absorption, the chromatic dispersion, and/or the backscattering implied by fiber attenuation, the reflected light pulses do not have the same form as the sampling light pulses. Instead, a main reflection peak is typically followed by the so-called diffusion tail such that the reflected light pulses—and hence the detection signals as well—have a characteristic asymmetric form. The symmetry parameter S provides a measure of the imbalance between the leading edge of a detection signal and the corresponding trailing edge. Since this imbalance is caused by fiber attenuation, useful information regarding fiber attenuation can be extracted from the symmetry parameter. This will become more apparent from the description of exemplary embodiments of the invention below. The symmetry parameter may be computed for individual reflected light pulses as well as for the combined signal.

The sampling light pulses may have a predefined pulse width, preferably a pulse width between 1 μs and 1 ms, preferably between 200 μs and 400 μs. Further, the different delays may differ by integer multiples of a predetermined time increment. For example, the difference in the delay between the detection signals corresponding to a first and a second sampling light pulse and between each of the detection signals corresponding to subsequent sampling light pulses may correspond to the time increment. Then, the difference in the delay between the detection signals corresponding to the first and a third sampling light pulses may correspond to twice the time increment, and so on. The corresponding combined signal might then correspond to a superposition of detection signals associated with different delays. Then, if the time evolution of the combined signal is analyzed, variations in the value of the combined signal are observed for values of the delays differing by the predetermined time increment. Preferably, the time increment may be between 100 ns and 75 μs and the sampling period may be between 50 ns and 50 μs. Further, the time increment should preferably range between 1/200 and 1/3 of the pulse width.

However, detection signals corresponding to a succession of sampling light pulses preferably have delays associated therewith that correspond to integer multiples of the predetermined time increment and which are not monotonously increasing or decreasing. For example, the detection signal corresponding to a first sampling light pulse may be associated with a delay corresponding to 1 time increment, the detection signal corresponding to a second sampling light pulse may be associated with a delay corresponding to 4 times the time increment, the detection signal corresponding to a third sampling light pulse may be associated with a delay corresponding to 3 times the time increment and so forth in a disordered, non-monotonous manner. Thereby, an increased tolerance against jitter or wander effect of the clock signal is achieved.

In fact, the time scale provided by the clock signal may be subject to deviations from ideal periodicity. The amplitude of such deviations usually oscillates and is characterised by a so-called jitter period. This could lead to consequent deviations of the delays of the detection signals from the desired values. As a result, part of the detection signals corresponding to part of a succession of sampling light pulses could for example be advanced with respect to the desired delay values, whereas another part of the detection signals corresponding to another part of the succession of sampling light pulses could be retarded with respect to the desired delay values. Thereby, the resulting combined signal could be disturbed and possibly introduce errors in the determination of the position of the irregularity in the optical transmission fiber.

By associating delays to the detection signals corresponding to a succession of sampling light pulses in a disordered way, i.e. not monotonously increasing or decreasing, the aforementioned effects of jitter and wander are advantageously avoided, or at least significantly reduced. This will be shown in detail below with reference to the embodiment of the invention shown in FIG. 3.

The reflected light pulses may be detected with a predefined sampling period, wherein the time increment is preferably different from integer multiples of the sampling period. This way the possibility is minimized that samplings are made coinciding with variations in the value of the combined signal, which could lead to an accumulation of inaccuracies in the obtained combined signal and hence to an increased uncertainty in the determination of the position of the irregularity in the optical transmission fiber.

In preferred embodiments of the invention, for each of the different delays, a predetermined number of sampling light pulses is emitted, a predetermined number of detection signals with a same delay is generated, and an average detection signal is generated by averaging over the predetermined number of detection signals for each of the different delays, and wherein the combined signal corresponds to a superposition of the average detection signals. For example, K different sampling light pulses might be emitted and consequently K different detection signals with a given delay may be generated. The average detection signal for the given delay then results from averaging over the K detection signals corresponding to the given delay. The combined signal then corresponds to a superposition of the average detection signals. This averaging mechanism generates a cleaner combined signal which is less subject to random error sources. The same effect can be achieved by first generating several combination signals and finally averaging over the several combination signals.

A further aspect of the invention relates to an optical time domain reflectometer for detecting an irregularity in an optical transmission fiber according to the method of the invention comprising a light source configured for emitting a succession of sampling light pulses into the optical transmission fiber. Herein, the term "light source" is understood to have a broad meaning and covers any kind of light source suitable for its use in a fiber optic transmission system, like, but not restricted to, a laser light source.

The optical time domain reflectometer according to the invention further comprises a light receiver configured for detecting reflected light pulses resulting from the reflection of the sampling light pulses at the irregularity in the optical transmission fiber and for generating corresponding time-dependent detection signals, wherein different delays are associated with detection signals corresponding to different sampling light pulses, and a processing unit operatively connected to the light receiver and configured for obtaining a combined signal from the detection signals. The light receiver may comprise a pin diode, but using a more complex receiver, such as a coherent receiver, is also possible. The time-dependent detection signals are preferably electrical signals, typically having an amplitude proportional to the amplitude of the corresponding reflected light pulse.

The sampling light pulses are emitted in a succession, which means that the sampling light pulses are timely ordered and that one pulse is emitted at a time. The sampling light pulses may be emitted with different real delays. To this purpose, the light source may be configured for emitting a succession of sampling light pulses into the optical transmission fiber with different delays. Alternatively, the processing unit may be configured to associate with detection signals corresponding to different sampling light pulses a virtual delay, different for each detection signal.

Further, the optical time domain reflectometer according to the invention comprises an analyzing unit operatively connected to the processing unit and configured for analyzing the combined signal for determining the position of the irregularity in the optical transmission fiber with respect to the optical time domain reflectometer, wherein the processing unit is further configured for obtaining the combined signal from a superposition of the detection signals.

In a preferred embodiment of the invention, the OTDR further comprises a control unit operatively connected to the light source and configured for generating the clock signal and for controlling the light source. Herein, controlling the light source may comprise configuring it such that properties of the emitted sampling light pulses take desired values. In particular, the pulse width, the delays relative to the clock signal and/or the predetermined time increment may be selectively adjusted by the control unit.

According to preferred embodiments of the invention, the OTDR further comprises an optical component assembly and a connector, wherein the connector is configured for connecting the OTDR to an optical transmission fiber and wherein the optical component assembly is arranged between the light source and the light receiver and is configured for directing light pulses coming from the light source towards the connector and for directing light pulses coming from the connector towards the light receiver. Typically, the optical component assembly may comprise a circulator, a directional coupler, or the like.

In a preferred embodiment of the invention, the processing unit and/or the control unit may comprise an analogue/digital converter. By means of the analogue/digital converter, analogue optical signals can be converted into digital electrical signals and vice versa.

According to preferred embodiments of the invention, the processing unit, the analyzing unit, and the control unit may be comprised in an integrated device.

In preferred embodiments of the invention, the OTDR is further configured for detecting the irregularity in the optical transmission fiber according to any of the method embodiments described above.

According to preferred embodiments of the invention, the processing unit is further configured for generating a clock signal and for associating detection signals corresponding to different sampling light pulses with different delays with respect to the clock signal.

In preferred embodiments of the invention, the processing unit is further configured for delaying the detected signals in order to generate said different delays

DESCRIPTION OF THE PREFERRED EMBODIMENTS

Figure 1:
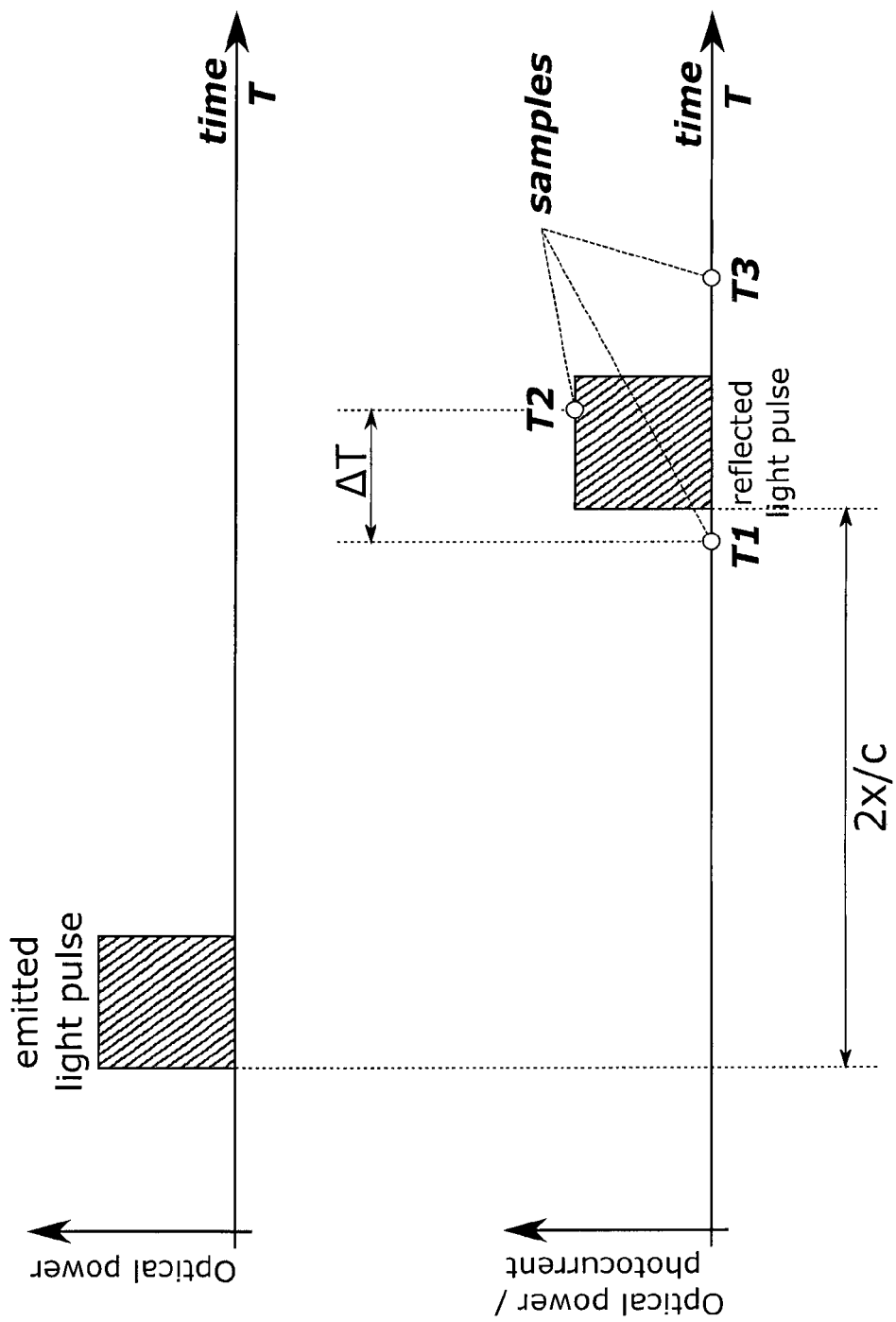
FIG. 1 shows a schematic representation of a conventional method for determining the position of an irregularity in an optical transmission fiber using an OTDR.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

FIG. 1 shows a schematic representation of a conventional method for determining the position of an irregularity in an optical transmission fiber using an OTDR commonly known in the art. The figure shows in the upper row the time evolution of a light pulse emitted by the OTDR and in the lower row the reflected light pulse resulting from the reflection at a distance x from the OTDR of the light pulse of the upper row detected by the OTDR with a predefined sampling period $\Delta T$. Also shown are the corresponding sampling points T1 to T3. As shown in the figure, where both the upper row and the lower row share a common time scale on the horizontal axis, the reflected light pulse is detected in the OTDR after a time $2x/c$ measured from the time of emission, where c stands for the speed of light within the fiber. If the sampling period is denoted by $\Delta T$ the receiver is able to take samples every $\Delta T$, which corresponds to the distance between T1 and T2, and between T2 and T3. The position of the irregularity can be determined by measuring the time elapsed between the emission of the sampling light pulse and the detection of the reflected light pulse. Assuming that the reflected light pulse of the figure results from a sampling light pulse which has been reflected almost completely by the corresponding irregularity, this interval of time might, for instance, be measured between the emission of the leading edge of the sampling pulse and the detection of the leading edge of the reflected pulse. However, it can only be concluded that the leading edge of the pulse is detected at some time between the first sampling point T1 and the second sampling point T2. This means that the position x of the irregularity can be determined with a precision $\Delta x = c \cdot \Delta T/2$ only. For example, for a sampling period $\Delta T = 1$ µs and a speed of light in the fiber $c = 2 \cdot 10^8$ m/s, the position of the irregularity can be determined with a precision $\Delta x = 100$ m only.

Figure 2:
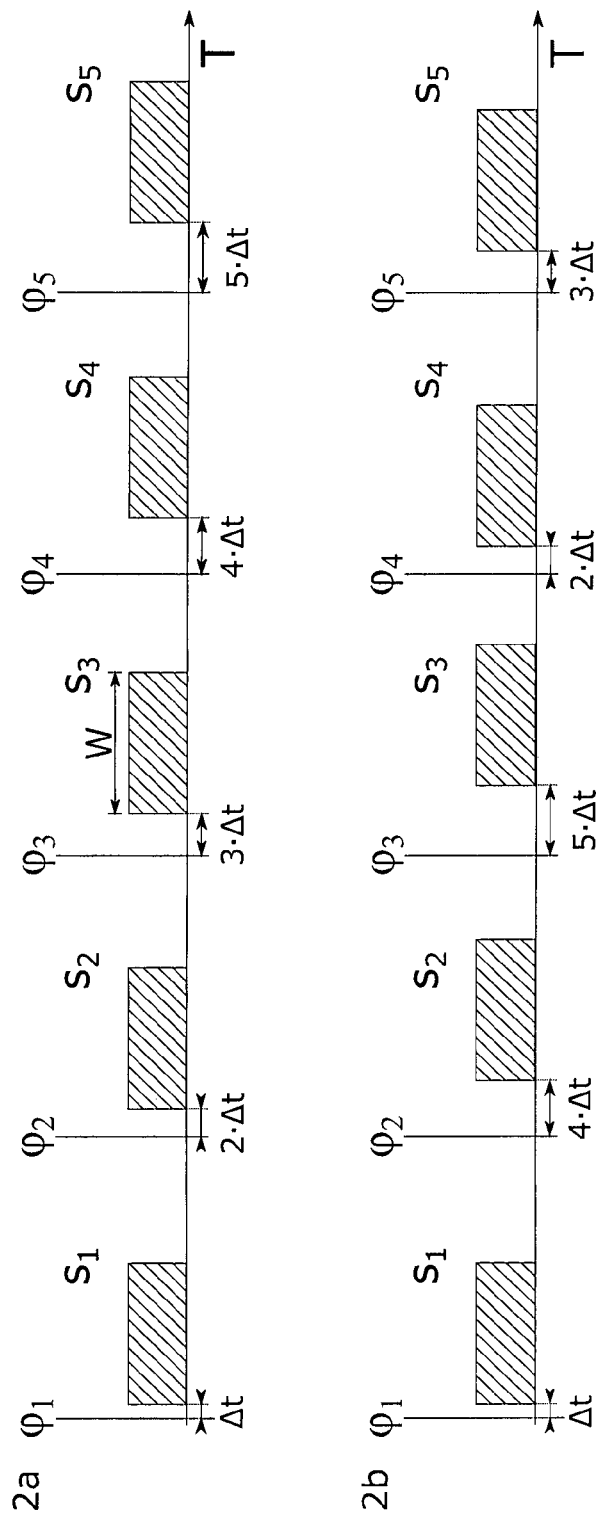
FIG. 2 shows a schematic representation of a succession of sampling light pulses emitted into the optical transmission fiber with different delays relative to a clock signal:
   a. shows a succession of sampling light pulses having monotonously increasing delays;
   b. shows a succession of sampling light pulses having delays which are not monotonously increasing or decreasing.

FIG. 2 shows a schematic representation of a succession of sampling light pulses $s_1$ to $s_5$ emitted into the optical transmission fiber with different delays relative to a clock signal, such that the corresponding detection signals are associated with such different delays relative to the clock signal. The clock signal provides a regular and stable timescale which allows referencing the delays to evenly spaced clock signal points $\varphi_1$ to $\varphi_5$, separated by regular clock signal cycles $\Delta\varphi$. The sampling light pulses $s_1$ to $s_5$ are timely ordered, such that one pulse is emitted at a time. All pulses have a predefined pulse width W. The different delays of the sampling light pulses with respect to the clock signal differ by multiples of a predetermined time increment $\Delta t$. FIG. 2a shows a succession of sampling light pulses having monotonously increasing delays with respect to the clock signal. A first sampling light pulse $s_1$ is emitted with a delay $\Delta t$ with respect to the clock signal point $\varphi_1$, that is at a time $T = \varphi_1 + \Delta t$. A second sampling light pulse $s_2$ is emitted with a delay $2\Delta t$ with respect to the clock signal point $\varphi_2$, that is at a time $T = \varphi_2 + 2\cdot\Delta t$, namely a time $\Delta\varphi + \Delta t$ later, and so on. In this exemplary embodiment, the pulse width W is chosen to be smaller than the corresponding clock signal cycle $\Delta\varphi$ such that the individual sampling light pulses do not overlap in time. Hence, each of the sampling light pulses $s_1$ to $s_5$ is characterised by the corresponding delay with respect to the clock signal.

FIG. 2b shows a succession of sampling light pulses emitted into the optical transmission fiber with disordered delays relative to the clock signal corresponding to multiple integers of the predetermined time increment $\Delta t$. Hence, the corresponding detection signals will have delays associated therewith that correspond to integer multiples of the predetermined time increment $\Delta t$ which are not monotonously increasing or decreasing. By associating delays to detection signals corresponding to a succession of sampling light pulses in such a disordered way, the effects of jitter and wander are circumvented.

Figure 3:
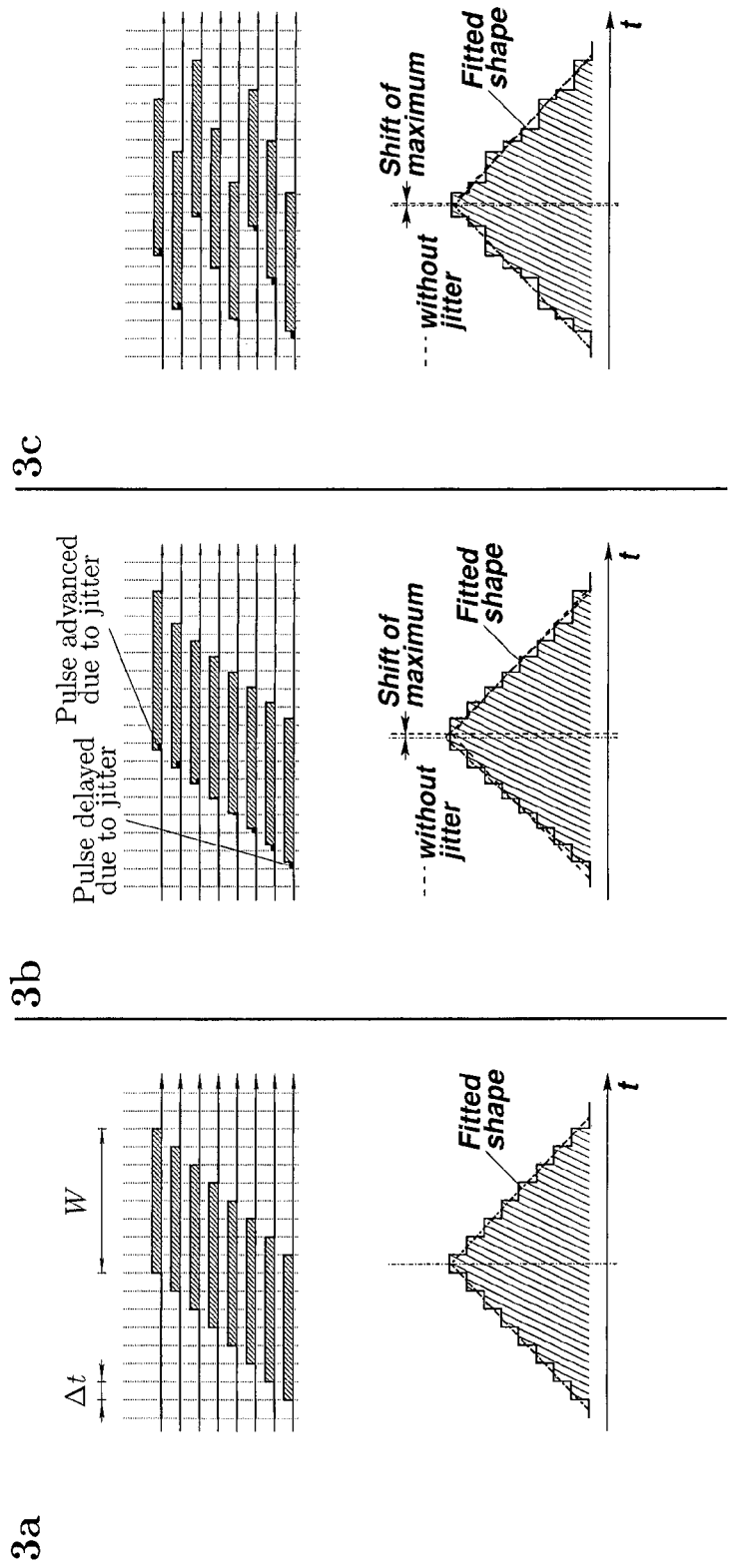
FIG. 3 shows a schematic representation of time-dependent detection signals resulting from a succession of sampling light pulses and the effects of jitter:
  a. shows detection signals corresponding to a succession of ideal sampling light pulses having monotonously increasing delays in the absence of jitter;
  b. shows detection signals corresponding to a succession of sampling light pulses having monotonously increasing delays and the effect of jitter;
  c. shows detection signals corresponding to a succession of ideal sampling light pulses having disorderedly increasing delays and the cancellation of the effect of jitter.

FIG. 3 illustrates the effects of jitter and wander on the combined signal obtained detection signals resulting, for example, from a succession of sampling light pulses emitted in the way shown in FIGS. 2a and 2b. FIG. 3a shows a succession of detection signals associated with continuously increasing delays corresponding to continuously increasing integer multiples of the predetermined time increment $\Delta t$ with respect to an ideal clock signal that is not affected by jitter or wander. FIG. 3b shows the effects of jitter or wander on the succession of detection signals of FIG. 3a. Small black rectangles indicate the timely variation in the start time of the detection signals introduced by jitter or wander. In addition to affecting the aforementioned start time, jitter and wander also effect the width of the pulses. As seen in the figure, the jitter period is in this case such that the three first detection signals of the succession are retarded with respect to the ideal foreseen delay due to jitter, whereas the three last detection signals of the succession are advanced with respect to the ideal foreseen delay due to jitter. As a consequence, the maximum of the triangular function fitted to the combined signal obtained from the detection signals of FIG. 3b is shifted with respect to the maximum of the triangular function fitted to the combined signal obtained from the detection signals of FIG. 3a, which corresponds to the ideal case in the absence of jitter or wander. As a result, a smaller delay is measured for the combined signal and hence the irregularity is assumed to be closer to the OTDR than it actually is.

FIG. 3c shows the combined signal obtained if the same detection signals of FIGS. 3a and 3b are associated with delays corresponding to integer multiples of the predetermined time increment in a disordered way, according to the pattern shown in FIG. 2b. As seen in FIG. 3c, the shift in the triangular function fitted to the combined signal due to jitter is significantly reduced in this case, such that the final shape is very similar to that of the triangular function fitted to the combined signal of FIG. 3a. The use of a larger number of pulses may even result to the shift due to jitter and wander being averaged out.

A large number of techniques are known to disorderly associate delays corresponding to integer multiples of a predetermined time increment to a succession of signals. In the following, a solution that can be implemented very easily is explained. Assuming that N pulses have to be generated, their delay D can be determined using the equation $D=[\mathrm{mod}(i \cdot M, N)+1] \cdot \Delta t$, where i is an index identifying the pulse and ranging from 1 to N and $\Delta t$ is the predetermined time increment. The operation mod denotes the modulo operator as used in modular arithmetic. In detail, the modulo operation $r=\mathrm{mod}(a,b)$ is defined in such a way, that the remainder r and the input variables a and b satisfy the condition $a=n \cdot b + r$ with n representing a non-negative integer and $0 \leq r < b$. Furthermore, M stands for an integer smaller than N, where M and N do not have any common divisor other than 1. Without affecting the functionality, the term +1 can be omitted in this equation. The table below shows the distribution of the delays for an example with N=8 and M=5.

| index | delay |
| --- | --- |
| i = 1 | 6 · $\Delta t$ |
| i = 2 | 3 · $\Delta t$ |
| i = 3 | 8 · $\Delta t$ |
| i = 4 | 5 · $\Delta t$ |
| i = 5 | 2 · $\Delta t$ |
| i = 6 | 7 · $\Delta t$ |
| i = 7 | 4 · $\Delta t$ |
| i = 8 | $\Delta t$ |

The numbers above have been exemplary chosen for illustrating the technique. In a preferred embodiment of the invention, N equals 200 and M is equal to 164.

Figure 4:
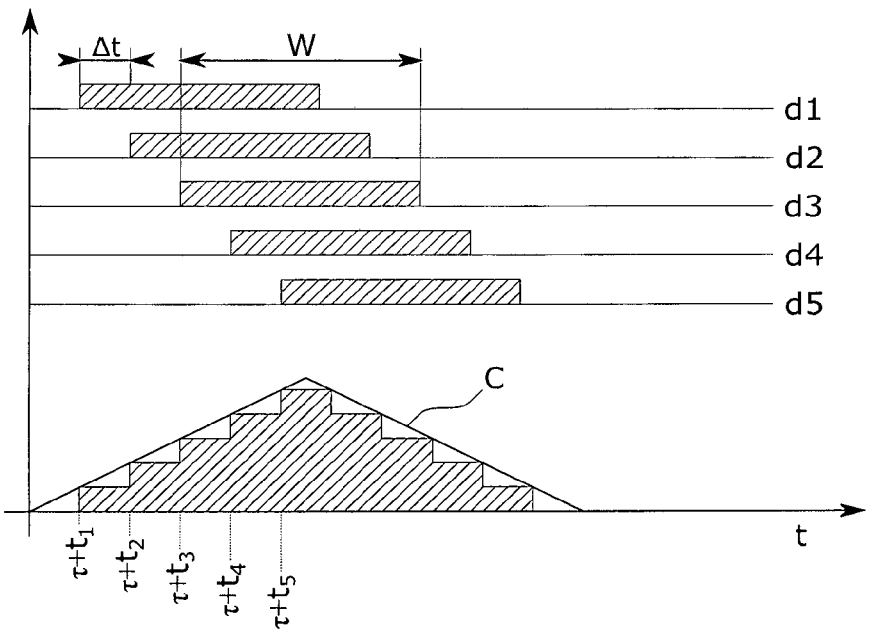
FIG. 4 shows a schematic representation of time-dependent detection signals resulting from the succession of sampling light pulses of FIG. 2 and the obtained combined signal, according to an embodiment of the invention. The effects of fiber attenuation and of different reflectivities of irregularities are not taken into account:
  a. refers to a first (test) irregularity;
  b. refers to a second irregularity.
Figure 4:
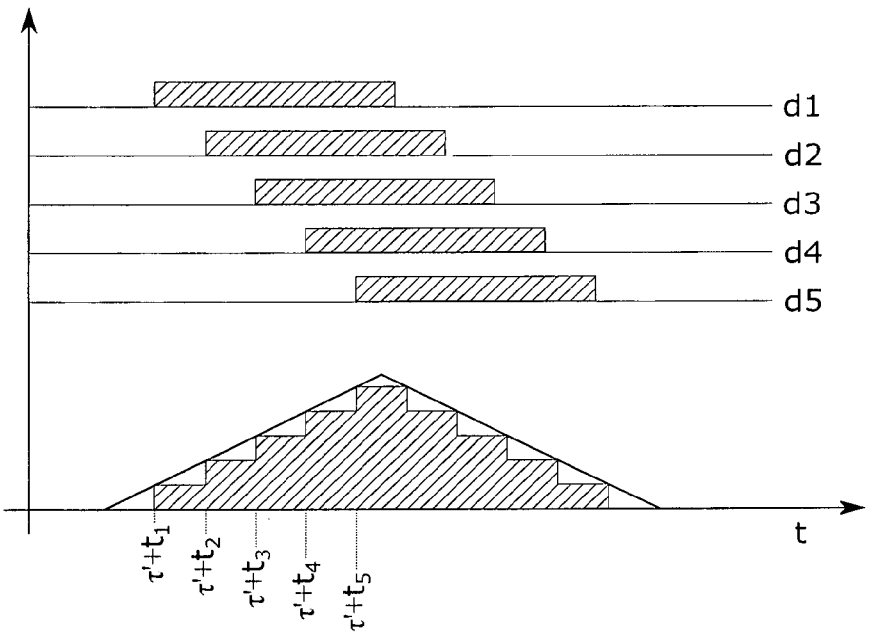

FIG. 4a shows a schematic representation of time-dependent detection signals $d_1$ to $d_5$, resulting from the succession of sampling light pulses of FIG. 2. The obtained combined signal C is also shown. Again, for simplicity, ideal pulses are considered, assuming instantaneous pulse increments and complete reflection, and neglecting the effects of attenuation. As in FIG. 3, the horizontal axis corresponds to a clock signal time scale t with respect to which the delays are determined, not to be confused with the absolute time scale T of FIGS. 1 to 2. The detection signal di corresponds to the sampling light pulse $s_i$ emitted with a delay relative to the clock signal $t_i=(i-1)\cdot \Delta t$, with i=1, ... , 5. The sampling light pulse $s_i$ is reflected back at an irregularity resulting in a reflected light pulse $r_i$. The reflected light pulse $r_i$ starts being detected at a time $t_i+\tau$, where $\tau$ is the time elapsed between the emission of the sampling light pulse $s_i$ and the detection, for example, of the leading edge of the reflected light pulse $r_i$ measured in the scale of clock signal time t. $\tau$ is proportional to the distance between the irregularity and the OTDR. The detection signal $d_i$ resulting from the reflected light pulse $r_i$ is active for a time W, that is between times $t=t_i+\tau$ and $t=t_i+\tau+W$.

The resulting combined signal C corresponds to a superposition of the detection signals $d_1$ to $d_5$ and is shown in the bottom diagram. Also shown in the figure is a triangular function to which the combined signal has been fitted.

The time dependent detection signals $d_1$ to $d_5$ of FIG. 4a could result from the reflection of sampling light pulses at a test irregularity located at a known distance from the OTDR, corresponding for example to a connection port of the OTDR configured for connecting the OTDR to an optical transmission fiber. In that case, $\tau$ would be proportional to the distance between the test irregularity and the OTDR, and the combined signal of FIG. 4a could be used as a calibration signal, to which a subsequent combined signal might be compared. Such a subsequent combined signal is shown in FIG. 4b.

FIG. 4b displays the same elements as FIG. 4a but since the time-dependent detection signals therein result from the reflection of sampling light pulses at an irregularity located further away from the OTDR than the test irregularity of FIG. 4a, all time values including $\tau$ in FIG. 4a will include instead a different parameter $\tau'$, with $\tau'>\tau$, and $\tau'$ being proportional to the distance between the irregularity and the OTDR. Hence the calibration signal (i.e. the combined signal of FIG. 3a) and the combined signal of FIG. 4b differ by a time shift $\Delta\tau=\tau'-\tau$, due to the different distances between the OTDR and the test irregularity and the OTDR and the irregularity. Since the distance between the OTDR and the test irregularity, $x_{test}$, is known, the distance between the OTDR and the irregularity can be obtained from $\Delta\tau$: it corresponds to $x_{test}+c\cdot\Delta\tau/2$.

Figure 5:
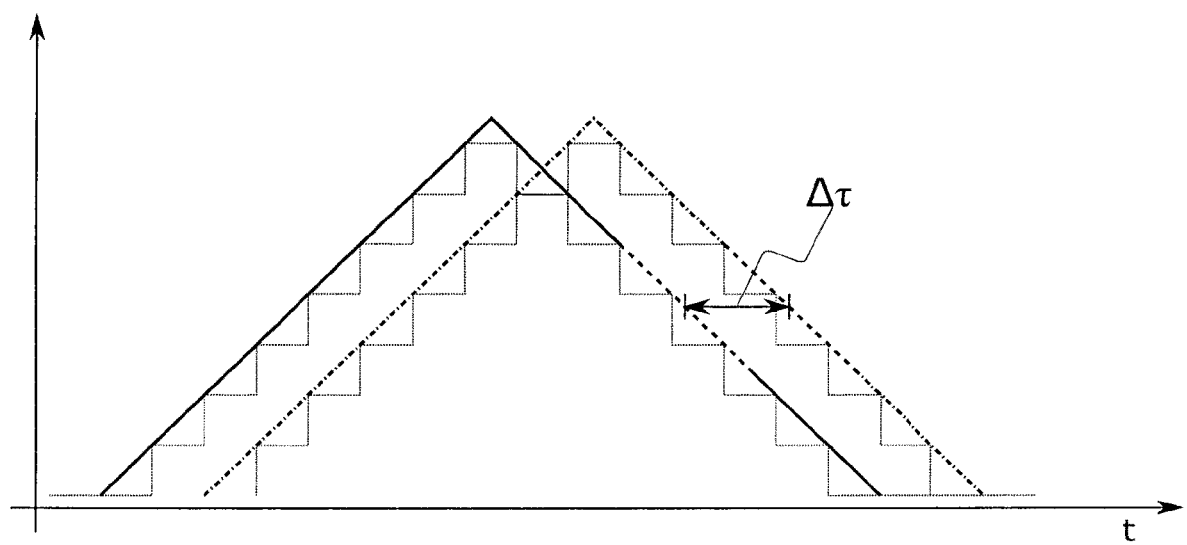
FIG. 5 shows a schematic representation of the calibration signal and the combined signal of FIG. 4.

FIG. 5 shows the calibration signal of FIG. 4a and the combined signal of FIG. 4b on the same clock signal time scale. The signals are shifted with respect to one another by a time shift Δτ=τ'−τ, due to the different distances between the OTDR and the test irregularity of FIG. 4a and between the OTDR and the irregularity of FIG. 4b. According to this embodiment of the invention, the position of the irregularity in the optical transmission fiber is determined by analyzing the time shift Δτ.

Figure 6:
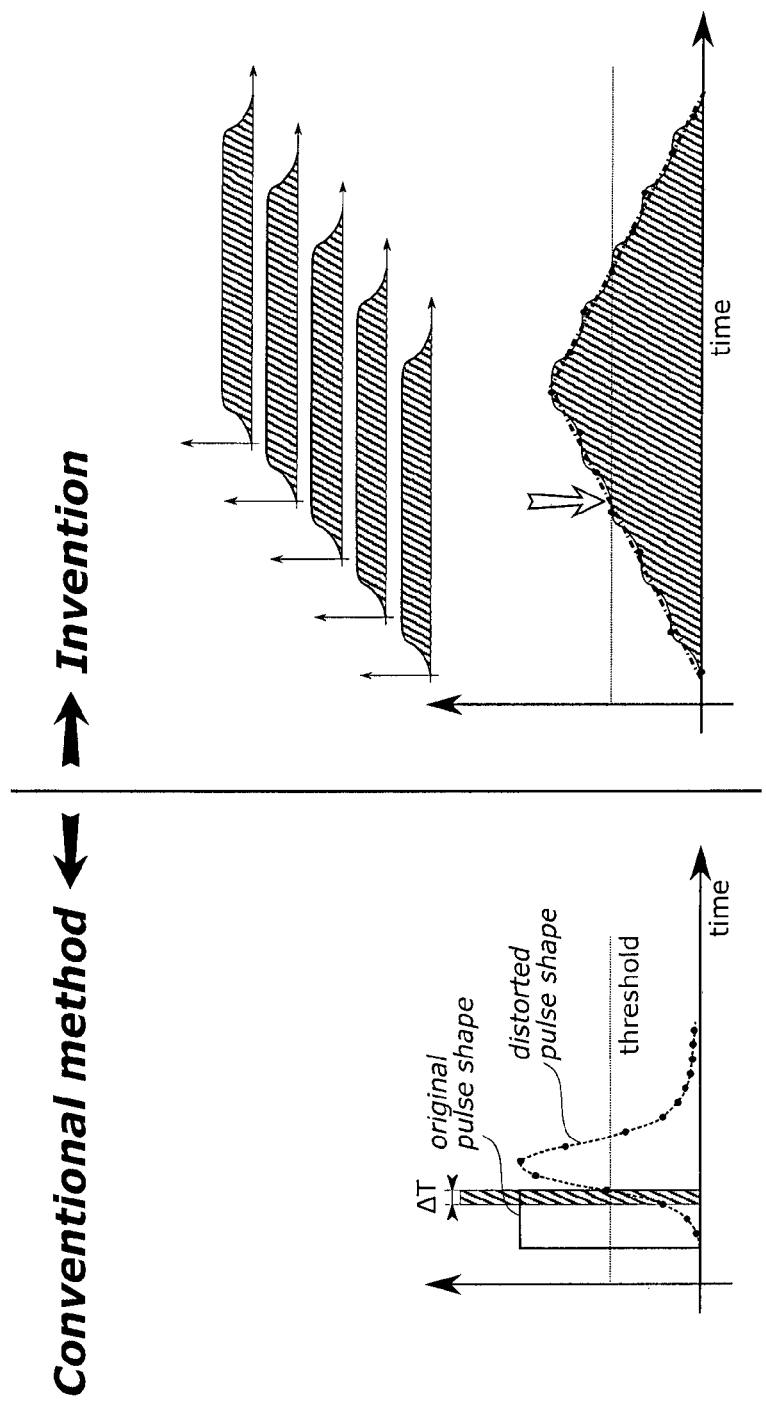
FIG. 6 compares the impact of distortions of the pulse shape on the precision of the determined position of the irregularity for the conventional method and for the method of the invention.

The impact of bandwidth limitation when processing the reflected light pulses and generating the corresponding detection signals and of the sampling rate on measurement precision is illustrated in FIG. 6. As already explained with respect to FIG. 1, the location of the irregularity can be determined only up to a deviation Δx=c·ΔT/2 when using the described conventional technique. Thus, acceptable precision conventionally requires the use of fast and hence costly hardware components able to offer short sampling periods ΔT. This requires large electrical bandwidths for processing the reflected light pulses and generating the corresponding detection signals. Hence, limited electrical bandwidth and effects such as attenuation and dispersion typically lead to distortions of the shape of the sampling and reflected light pulses, as illustrated in FIG. 6. Measurements from such distorted light pulses can be carried out with reduced accuracy only, in particular when the shape of the pulses is no longer symmetrical to its center point. When using the method of the invention, the pulses also suffer from signal distortions, such that typically, the form of the pulses is smoothed. In spite of these distortions of the shape of the individual pulses and of a significantly longer sampling period, the combined signal can nevertheless be determined with high accuracy. In the shown example, it is assumed that an analytic function is fitted to the combined signal by means of a least mean square fitting. A remarkable advantage stems from the fact that the combined signal, and hence the corresponding fitting function as well, correspond to a superposition of the detection signals corresponding to many sampling light pulses, whence signal distortions that might be noticeable in the individual pulses or detection signals are rendered irrelevant for the purposes of determining the position of an irregularity in an optical transmission fiber.

Figure 7:
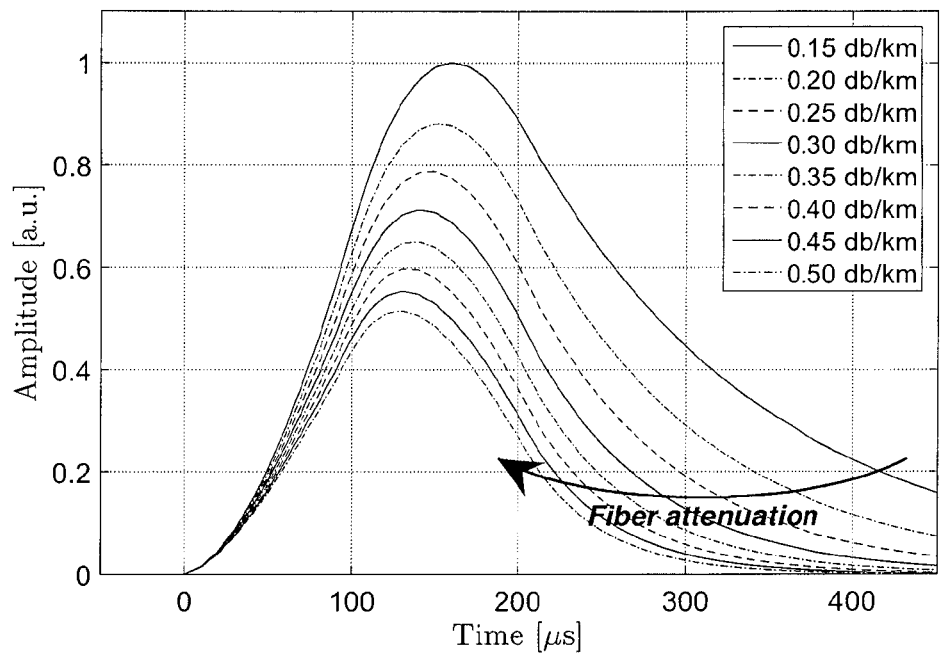
FIG. 7 shows the effects of fiber attenuation on the combined signal:
  a. shows the combined signals as resulting from the superposition;
  b. shows the combined signals normalized to have a maximum amplitude of 1.
Figure 7:
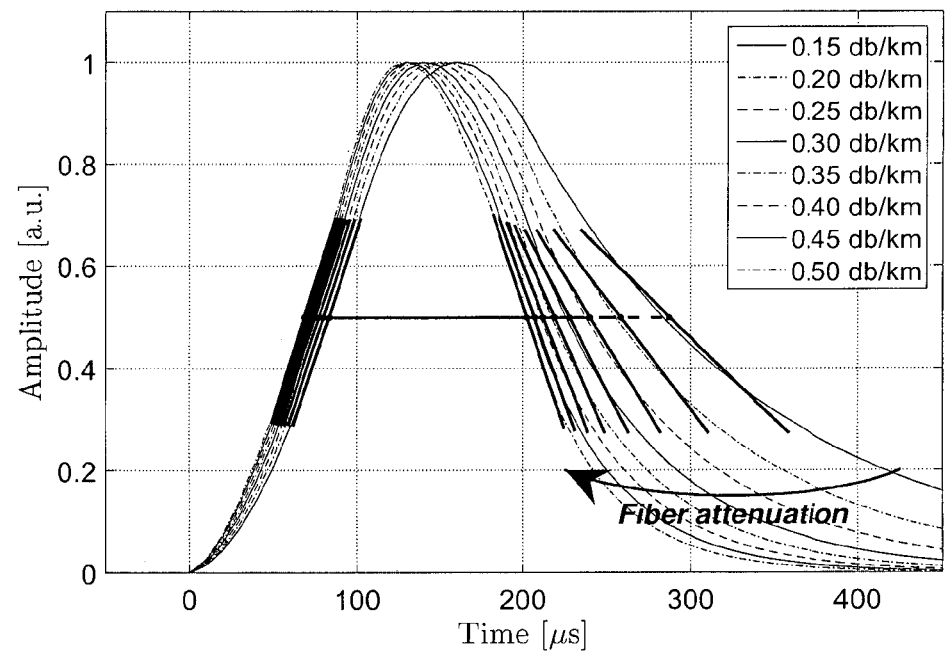

FIG. 7 shows the effects of attenuation upon combined signals obtained for a given irregularity and for different assumed levels of uniform fiber attenuation. FIG. 7a shows the combined signals as resulting from the superposition of the pulses without normalization, whereas a the combined signals presented in FIG. 7b have been normalized to have a maximum amplitude of 1. All combined signals have been fitted to analytic functions. As can be seen in the figure, fiber attenuation results in a signal shift which is smaller the larger the fiber attenuation is. The imbalance between the leading edge and the trailing edge is also inversely proportional to fiber attenuation. The data shown in FIG. 7b may be comprised in a set of stored data to which a calibration signal obtained by the OTDR can be compared. As a result of this comparison, the level of fiber attenuation can be determined and taken into account for subsequent measurements.

Figure 8:
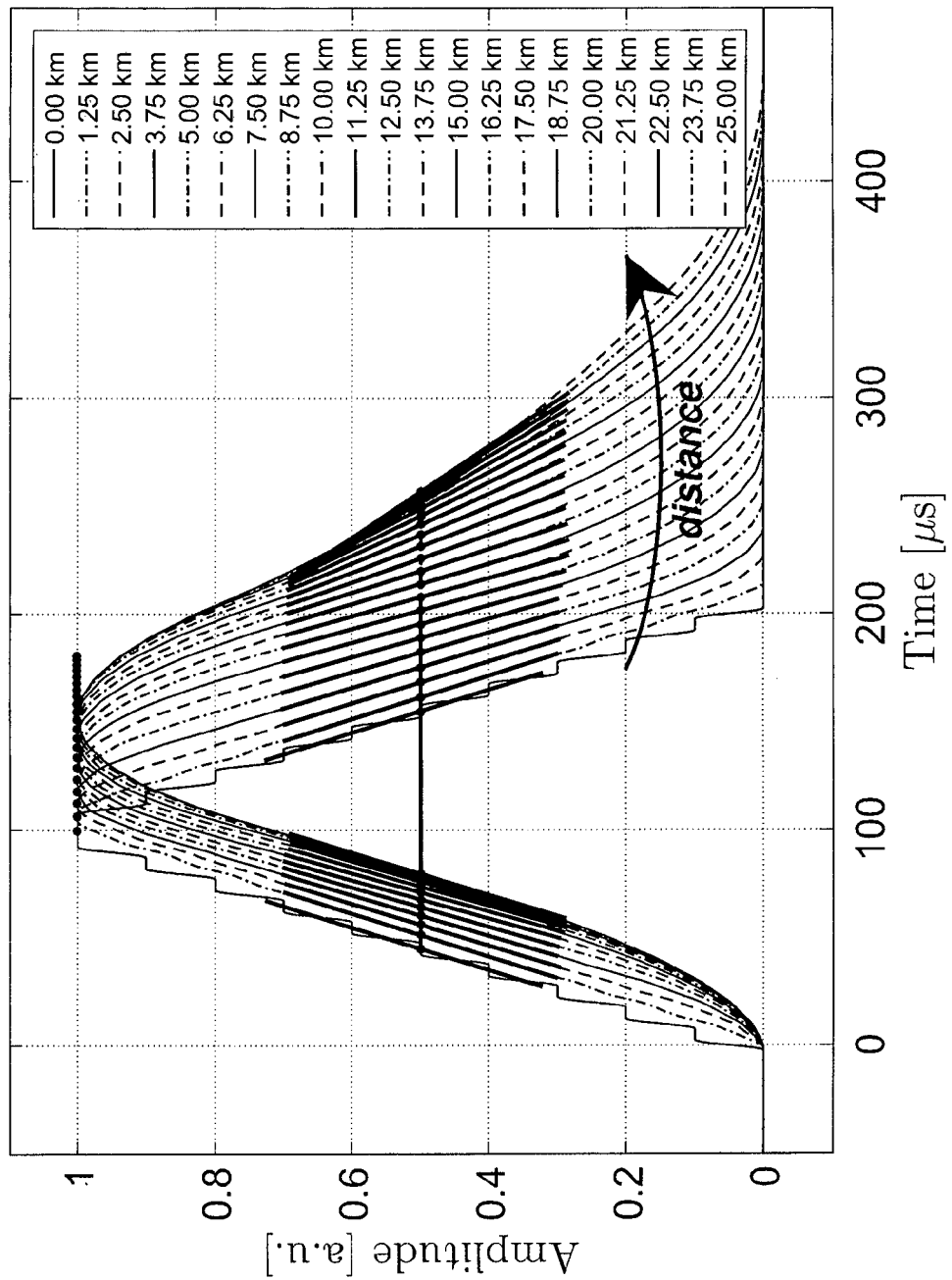
FIG. 8 shows normalized combined signals obtained for irregularities located at different positions of the optical transmission fiber.

FIG. 8 shows combined signals obtained for irregularities located at different positions of the optical transmission fiber. All combined signals have been normalized to have a maximum amplitude of 1. Alternatively, the zero of the spatial scale could be set to coincide with the location of a test irregularity. The combined signals shown are obtained by emitting a succession of 10 sampling light pulses with a pulse width of 100 μs and with different delays relative to a clock signal, differing by a time increment of 10 μs. In this case, a sampling period of 1.2 μs could be used.

Further, the effects of attenuation can be appreciated in FIG. 8. Normalization and attenuation cause the trailing edge and the leading edge of the signals to increasingly separate for increasing distance to the irregularity. Thereby, the combined signals become broader and more imbalanced, since the shifts of the trailing edges are larger than the shifts of the leading edges. This is caused by the exponential increase of Rayleigh backscattering with propagation distance induced by fiber attenuation.

A determination of the time shift between the combined signals provides a measure of the distance between the OTDR and the corresponding irregularity which is not limited by the sampling period, the pulse width, or by any other parameter related to the individual sampling light pulses imposed by the speed of the OTDR hardware components. For example, a resolution of 1 m has been achieved with a sampling rate of approximately 600 kHz by using pulses with a width of approximately 330 μs and by superimposing 196 pulses. Furthermore, by conducting several measurements it has been shown that the position of an irregularity located 1 m apart from the device could be determined with high repeatability. In contrast, the resolution of a conventional technique using the same sampling rate would be 167 m only.

Figure 9:
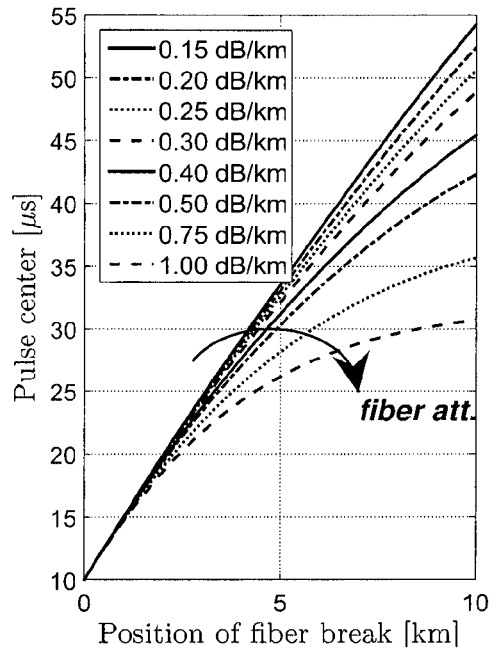
FIG. 9 shows plots of different optical parameters of the combined signals of FIG. 5
  a. shows the pulse center of the combined signals of FIG. 5 as a function of the distance between the irregularity and the OTDR.
  b. shows the symmetry parameter of the combined signals of FIG. 5 as a function of the distance between the irregularity and the OTDR.
  c. shows a plot of pulse center against symmetry parameter for the combined signals of FIG. 5.
Figure 9:
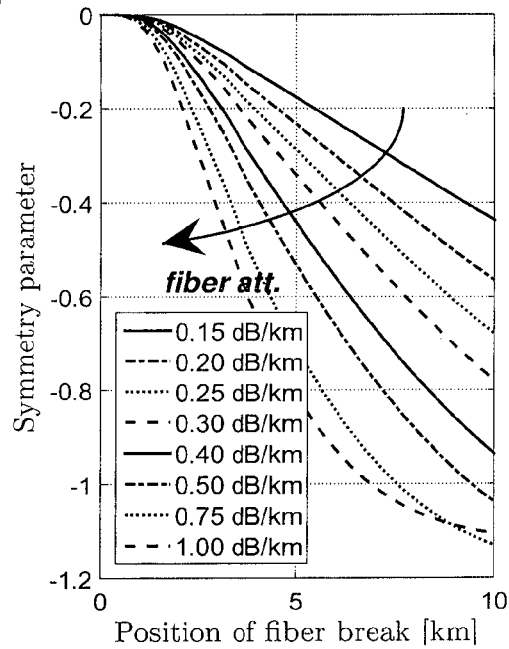
Figure 9:
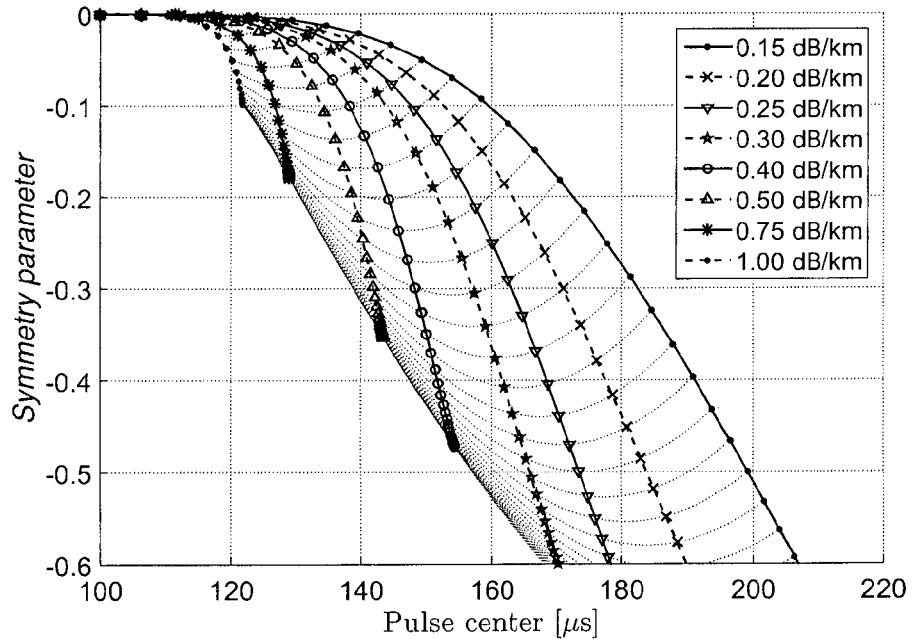

FIG. 9 shows plots corresponding to different optical parameters of the combined signals of FIG. 7. In FIG. 9a, the pulse center $\tau_{center}$ of each of the combined signals is displayed as a function of the distance between the irregularity and the OTDR. FIG. 9b shows the symmetry parameter of each of the combined signals plotted against the distance between the irregularity and the OTDR. FIG. 9c is a parametric representation of the symmetry parameter of the signals against the pulse center. By obtaining, for example, the pulse center and the symmetry parameter of a given combined signal, the corresponding fiber attenuation can be inferred from FIG. 9c. Once the level of fiber attenuation is known, FIG. 9a or FIG. 9b can be consulted to determine the position of the irregularity in the optical transmission fiber. This way of determining the position of the irregularity in the optical transmission fiber takes the effects of fiber attenuation into account and does not require resorting to a calibration signal. In particular, information like that contained in FIG. 9a-c can be comprised as stored data in the OTDR.

Figure 10:
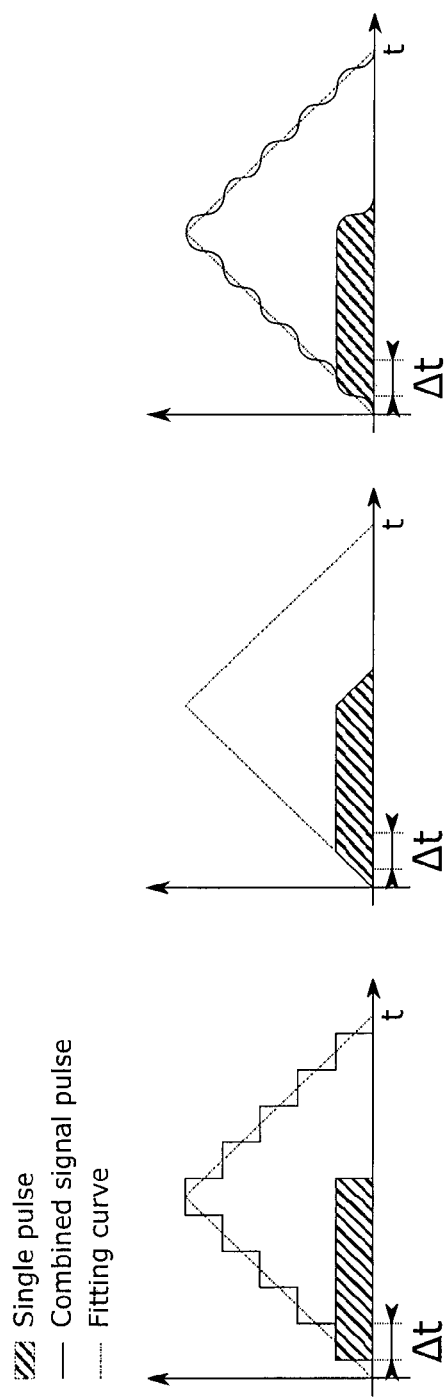
FIG. 10 shows the effects of different shapes of the sampling light pulses on the resulting combined signal.

Further advantageous aspects of the present invention are illustratively displayed in FIG. 10. The shaded elements shown therein illustrate three different possible shapes of single sampling light pulses. In contrast to the rectangular shape shown on the leftmost side, the pulse in the middle has inclined flanks, whereas the pulse shown on the right has edges that have been smoothed due to filtering effects or linear and nonlinear fiber effects. The combined signal generated from the shown sampling light pulses is represented for each of the pulse shapes by a solid curve and the corresponding analytical function fitted thereto is represented by a dashed line.

Due to different shapes of the individual sampling light pulses, the corresponding combined signals display different shapes. The combined signal in the middle of FIG. 10 displays a perfect triangular shape, the combined signal on the left corresponds to a stair function, whereas the combined signal on the right has irregular variations due to the smoothed edges of the individual sampling light pulses. However, the resulting analytical function fitted to the respective combined signals is the same for all considered pulse shapes. As a result, the particular shape of the individual pulses has negligible effects on the resulting combined signal and hence on the determination of the position of the irregularity in the optical transmission system.

Figure 11:
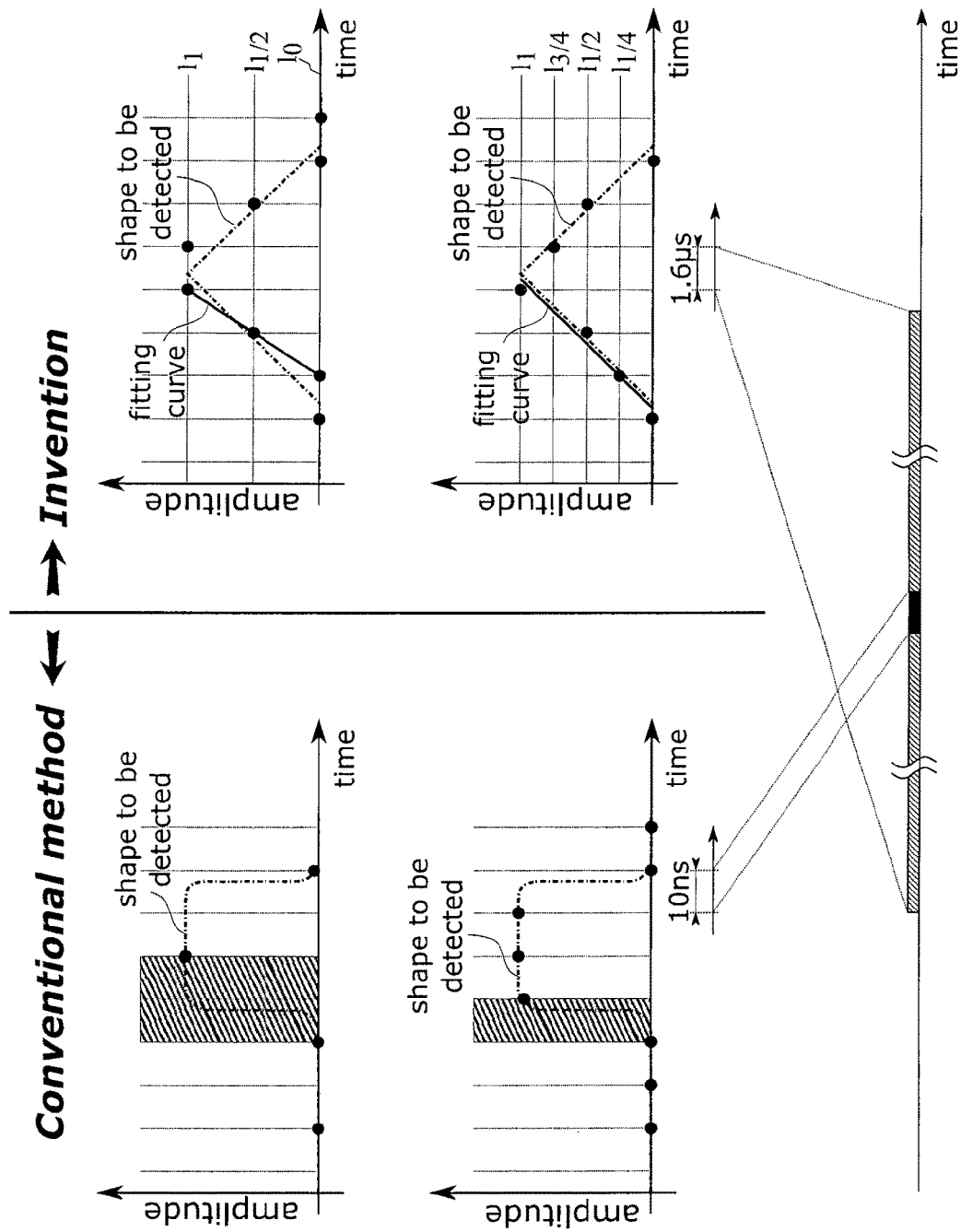
FIG. 11 shows a comparison of the accuracy requirements of a conventional OTDR to those of the invention.

FIG. 11 highlights the advantages of the invention over the prior art solutions with respect to the possibility of achieving an acceptable accuracy for determining the position of an irregularity in an optical transmission fiber without having to resort to short sampling period saw pulse widths, namely, without having to resort to costly high-speed hardware components. This also applies to the possibility of reconfiguring existing optical equipment, designed for purposes other than those of an OTDR, i.e. other than for determining the position of an irregularity in an optical transmission fiber according to the method of the invention, like an OTDR. For the cases shown on the left and on the right hand side, parameter values allowing to detected irregularities that are 1 m away from the OTDR are provided as examples.

The two drawings placed one above the other on the left side illustrate the role of the sampling rate when using the conventional OTDR technique elucidated above with respect to FIG. 1. The sampling points are signaled as dark dots. In the lower illustration, the sampling period has been halved as compared to the upper one. In both the upper and the lower left illustrations, the shaded area provides an estimate of the inaccuracy of the conventional OTDR technique of FIG. 1. The only statement that can be made from the detected samples is that the leading edge must lay within this area. As seen in the figure, decreasing the sampling period results in the width of the shaded area decreasing and thus leads to a more precise determination of the location of the irregularity.

The drawings on the right side of FIG. 11 illustrate the situation when using the invention with respect to combined signals. As seen in the figure, the time axis of the right hand side figure, corresponding to an embodiment of the invention, is significantly compressed as compared to the conventional OTDR technique of the left hand side, and hence corresponds to a larger timescale. The time divisions along the time axis of the left hand side correspond to 10 ns, whereas on the right hand side they correspond to 1.6 μs. This illustrates the lower requirements on time resolution posed by the invention for a given spatial resolution in the detection of the irregularity.

The same sampling period is assumed for both drawings on the right side of FIG. 11. However, a different resolution of the involved analog/digital converters is assumed, that results in different resolutions in the detection of the amplitude of the reflected light signals and in the generation of the corresponding detection signals. For illustration purposes, three different amplitude sensitivity levels are considered in the upper drawing, denoted by $l_0$, $l_{1/2}$ and $l_1$. Due to the limited resolution, the analytic function fitted to the combined signal (solid curve) deviates significantly from the leading edge of the ideal signal to be detected (dash-dotted curve). In the lower drawing, the resolution in the detection of the amplitude of the reflected light signals and in the generation of the corresponding detection signals is increased and five amplitude sensitivity levels $l_0$, $l_{1/4}$, $l_{1/2}$, $l_{3/4}$, and $l_1$ are possible. With this modification, the fitting curve provides a significantly improved estimate of the ideal curve.

Thus FIG. 11 illustrates that, whereas conventional OTDR techniques rely on a better time resolution, e.g. shorter sampling periods, for improving the accuracy with which the position of an irregularity in an optical transmission fiber can be determined, according to the method of the invention this accuracy can be improved by simply resorting to sufficiently sensitive analogue/digital converters, i.e. providing sufficient resolution. Hence, for the purpose of achieving a desired level of accuracy for determining the position of an irregularity in an optical transmission fiber, the method of the invention allows for the use of longer sampling light pulses. Further, while conventional methods call for costly high-speed hardware components, the aforementioned accuracy can be improved by means of the method of the invention via widely available non-costly analogue/digital converters. In particular, the resolution of standard analog/digital converters proves fully sufficient in terms of carrying out the invention.

Figure 12:
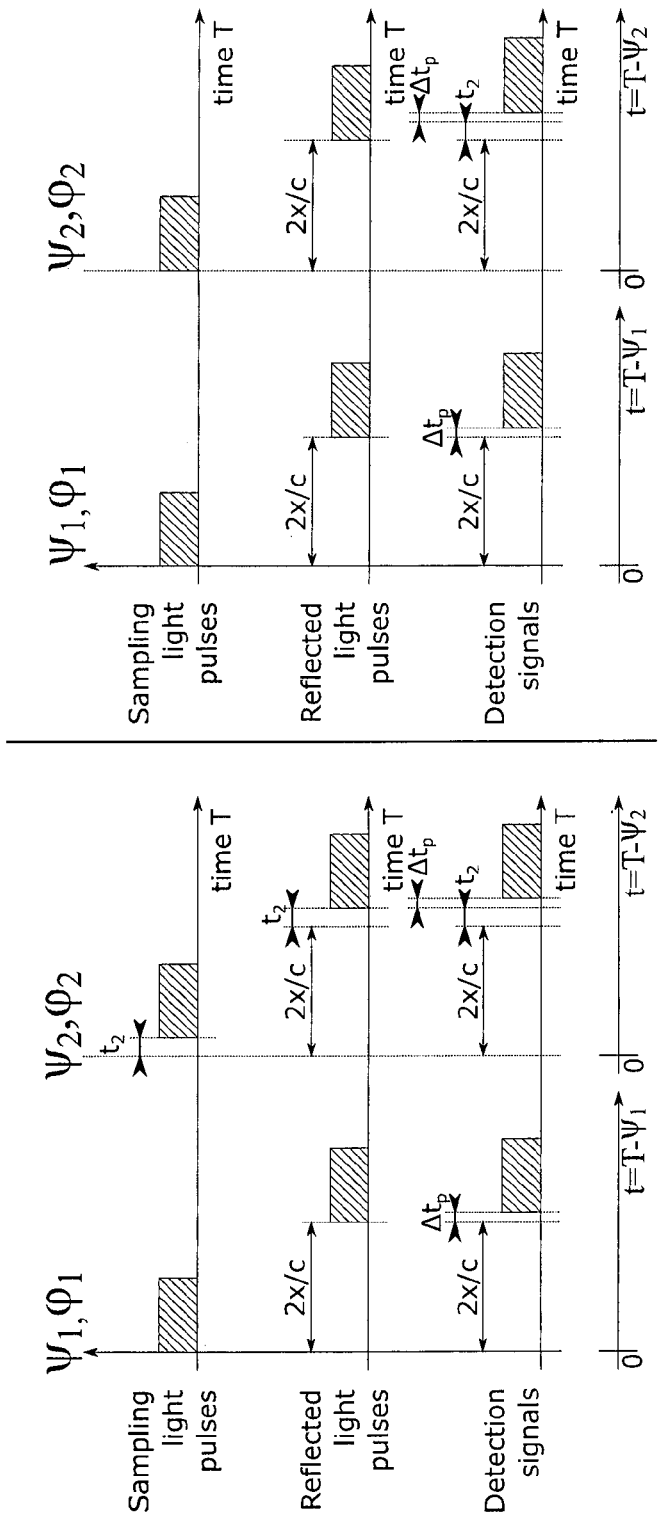
FIG. 12 shows different techniques for associating delays to the detection signals.

FIG. 12 shows two exemplary methods to generate the delays associated with the detection signals. On behalf of clarity, only two pulses are shown for each method. While sampling light pulses emitted by the OTDR and launched into the fiber to be measured are shown in the upper row, the resulting reflected light pulses received by the OTDR are shown in the middle row. The lower row shows the detection signals that are superimposed in order to generate the corresponding combined signal.

FIG. 12a shows sampling light pulses emitted with a predetermined delay $t_i$ relative to trigger points $\psi_1$ and $\psi_2$. These trigger points might be virtually generated in a random manner, but they might also be derived from a clock signal. In the latter case, equidistantly distributed trigger points are obtained that correspond to the clock signal points $\varphi_1$ and $\varphi_2$ shown in FIG. 2. Each reflected light pulse received at the OTDR is delayed by $2x/c$ with respect to the time at which the respective sampling pulse has been emitted and is delayed by $2x/c+t_i$ with respect to the respective trigger point, where $t_i$ stands for the delay introduced in FIG. 4. The corresponding detection pulses might be further delayed by a processing time $\Delta t_p$ and thus are delayed in total by $2x/c+t_i+\Delta t_p$ relative to the respective trigger point. The same delay appears on a time scale $t=T-\psi_i$ representing the time that has lapsed since the respective trigger point. Thus, two reflected light pulses labelled i and j are delayed by a time $t_i-t_j$ with respect to each other. Superposition of the corresponding detection signals results in the combined signals as described above.

An alternative method is shown in FIG. 12b. Sampling light pulses are emitted by the OTDR without delay (or with the same delay) relative to trigger points and the reflected light pulses are received with a delay of $2x/c$ relative to the trigger points (or further delayed by the same delay). When processing the received reflected light pulses, the delays $t_i$ associated with the resulting detection signals are introduced preferably in the digital domain, i.e. after an analog to digital conversion. Finally, the same detection signals as shown in FIG. 12a are obtained.

Both methods can be also be combined. In particular, some additional delays can be introduced in the digital domain in order to compensate for instabilities (jitter and wander) of a clock signal.

Figure 13:
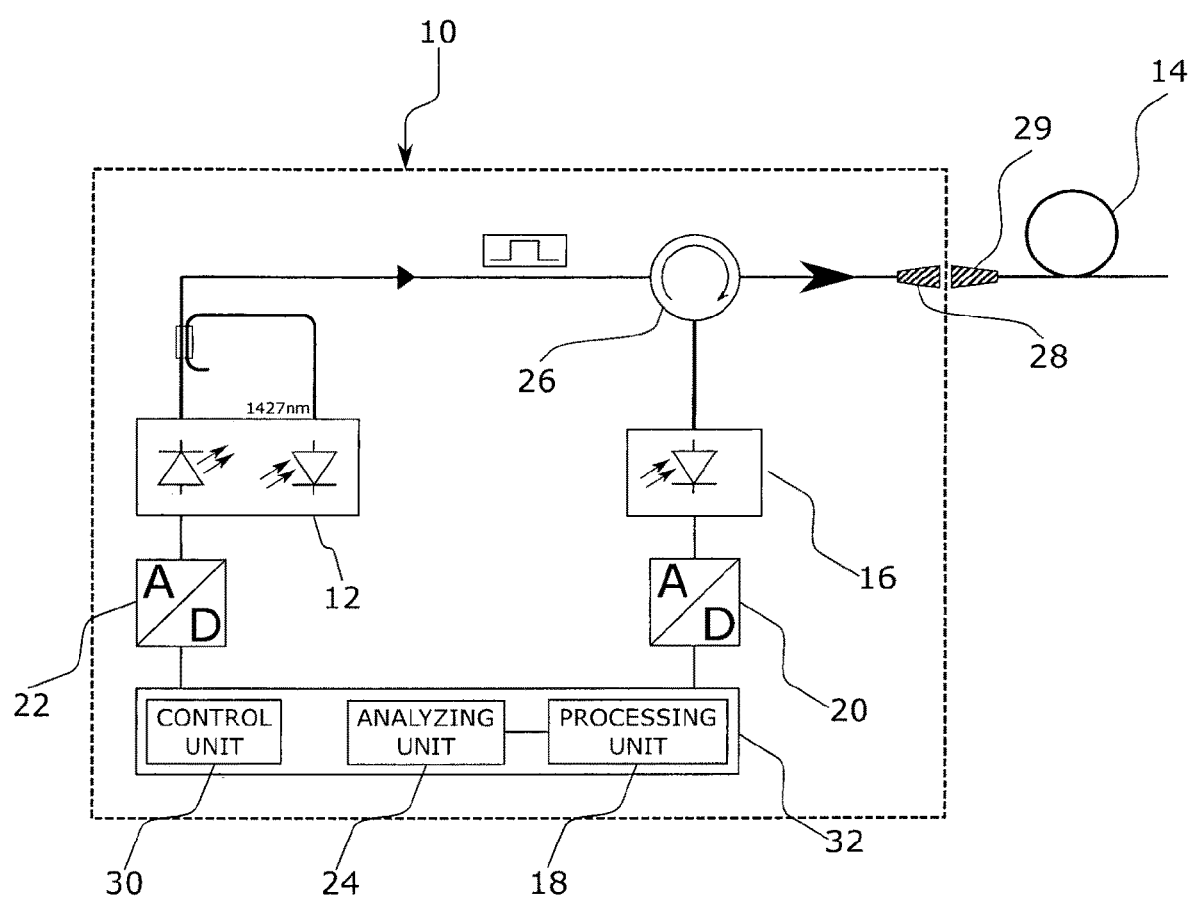
FIG. 13 shows a schematic representation of an OTDR according to an embodiment of the invention.

FIG. 13 shows a schematic representation of an OTDR 10 for detecting an irregularity in an optical transmission fiber according to an embodiment of the invention. The OTDR 10 comprises a light source 12, a light receiver 16, a processing unit 18, an analogue/digital converter 20 and a digital/analog converter 22, an analyzing unit 24, a circulator 26, a connector 28, and a control unit 30. The light source 12 is configured for emitting a succession of sampling light pulses into the optical transmission fiber 14 via a second connector 29 connected to the connector 28 of the OTDR. The sampling light pulses pass through the circulator 26 and are reflected at the connector 28 or at an irregularity in the optical transmission fiber 14, resulting in reflected light pulses. The reflected light pulses circulate back to the circulator 26 and are directed to the light receiver 16. The light receiver 16 is configured for detecting the reflected light pulses and for generating corresponding digital time-dependent detection signals by means of the analogue/digital converter 20. A processing unit 18 is operatively connected to the light receiver 16 via the analogue/digital converter 20 and is configured for generating a clock signal, for associating detection signals corresponding to different sampling light pulses with different delays with respect to the clock signal, and for obtaining a combined signal from the time-dependent detection signals generated by the light receiver 16. The analyzing unit 24 is operatively connected to the processing unit 18 and is configured for analyzing the combined signal for determining the position of the irregularity in the optical transmission fiber with respect to the OTDR. The control unit 30 is operatively connected to the light source 12 via the analogue/digital converter 22 and is configured for controlling the light source 12. In the embodiment shown, the processing unit 18, the analyzing unit 24, and the control unit 30 are comprised in an integrated device 32.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

REFERENCE SIGN LIST 10 optical time domain reflectometer
12 light source
14 optical transmission fiber
16 light receiver
18 processing unit
20 analog/digital converter
22 digital/analog converter
24 analyzing unit
26 component assembly
28 connector
29 connector
30 control unit
32 integrated device

The invention claimed is:

1. A method for determining a position of an irregularity in an optical transmission fiber using an optical time domain reflectometer, the method comprising the steps of:
  emitting a succession of sampling light pulses into the optical transmission fiber, wherein the sampling light pulses have a predefined pulse width;
  detecting each of a plurality of reflected light pulses that each result from a reflection of a respective one of the sampling light pulses that occurs at the irregularity in the optical transmission fiber,
  generating a plurality of detection signals that each correspond to a respective one of the plurality of detected reflected light pulses, wherein each detection signal is active for a time corresponding to the predefined pulse width;
  obtaining a combined signal from the plurality of detection signals; and
  analyzing the combined signal to determine the position of the irregularity in the optical transmission fiber with respect to the optical time domain reflectometer based on a time shift between the combined signal and a calibration signal;
  wherein the combined signal corresponds to a superposition of the plurality of detection signals;
  wherein the generation of each of the plurality of detection signals is time-dependent relative to a timescale;
  wherein a basis for the timescale comprises at least one of: a clock signal comprising a regular clock signal cycle, at least one trigger point;
  wherein at least one of the plurality of detection signals is, relative to the basis of the timescale, delayed by an amount of delay that differs from an amount by which at least one other of the plurality of detection signals is delayed relative to the basis of the timescale;
  wherein the calibration signal is obtained by the steps of:
    emitting into the optical transmission fiber a succession of calibration light pulses;
    detecting a plurality of reflected calibration light pulses that each result from a reflection of a respective one of the emitted calibration light pulses that occurs at a test irregularity located at a known distance from the optical time domain reflectometer;
    generating a plurality of calibration detection signals that each correspond to a respective one of the plurality of detected reflected calibration light pulses;
    generating the calibration signal using a superposition of the plurality of calibration detection signals.

2. The method of claim 1, wherein the test irregularity is a connection port of the optical time domain reflectometer configured for connecting the optical time domain reflectometer to an optical transmission fiber.

3. The method of claim 2, wherein the step of emitting the succession of calibration pulses is carried out when starting operation of the optical time reflectometer.

4. The method of claim 1, wherein the step of analyzing the combined signal further comprises normalizing an amplitude of the combined signal so that it has a same amplitude as the calibration signal.

5. The method of claim 4, wherein the time shift between the combined signal and the calibration signal is determined at a signal point corresponding to one of:
  the respective trailing edge of each of the combined signal and the calibration signal; or
  the respective leading edge of each of the combined signal and the calibration signal.

6. The method of claim 1, wherein the time shift between the combined signal and the calibration signal is determined at a signal point at which an amplitude of the combined signal and an amplitude of the calibration signal both have a predetermined value between 10% and 90% of a maximum signal amplitude.

7. The method of claim 1, wherein the step of analyzing the combined signal comprises fitting the combined signal and the calibration signal to an analytic function.

8. The method of claim 7, wherein the analytic function is a polynomial function.

9. The method of claim 1, wherein the step of analyzing the combined signal comprises calculating any of the following parameters:
  Surface:
  $$\Sigma_{i=1}^{N} c_i \text{ or } \int_{-\infty}^{\infty} c(t)dt;$$
  Pulse center:

$$\tau_{center} = \frac{\sum_{i=1}^{N} t_i \cdot c_i}{\sum_{i=1}^{N} c_i} \text{ or } \tau_{center} = \frac{\int_{-\infty}^{\infty} t \cdot c(t) dt}{\int_{-\infty}^{\infty} c(t) dt};$$

Symmetry parameter:

$$S = \frac{4}{\sqrt{2}} \cdot \frac{\tau_{max} - \tau_{center}}{\tau_{RMS}},$$

where $$\tau_{RMS} = \sqrt{\tau_{square} - \tau_{center}^2},$$

with $$\tau_{square} = \frac{\sum_{i=1}^{N} t_i^2 \cdot c_i}{\sum_{i=1}^{N} c_i} \text{ or } \tau_{square} = \frac{\int_{-\infty}^{\infty} t^2 \cdot c(t) dt}{\int_{-\infty}^{\infty} c(t) dt},$$

and $$\tau_{max} = \frac{\sum_{i=1}^{N} t_i \cdot c_i^2}{\sum_{i=1}^{N} c_i^2} \text{ or } \tau_{max} = \frac{\int_{-\infty}^{\infty} t \cdot c(t)^2 dt}{\int_{-\infty}^{\infty} c(t)^2 dt}.$$

wherein $c_i$ stands for the combination signal at a time $t_i$, wherein N stands for a number of sampling values.

10. The method of claim 1, wherein the sampling light pulses have a predefined pulse width.

11. The method of claim 10, wherein the predefined pulse width of the sampling light pulses is between 1 µs and 1 ms.

12. The method of claim 1, wherein each of the plurality of detection signals is, relative to the basis of the timescale, delayed by an amount of delay that differs from amounts by which remaining ones of the plurality of detection signals are delayed relative to the basis of the timescale, and wherein the amounts by which the plurality of detection signals are delayed relative to the basis of the timescale are each a different integer multiple of a predetermined time increment among a plurality of integer multiples.

13. The method of claim 12, wherein the respective delay of each of the plurality of detection signals is not, relative to delays of previously generated ones of the plurality of detection signals, monotonously increasing or decreasing.

14. The method of claim 12, wherein the predetermined time increment is between 100 ns and 75 µs.

15. The method of claim 1, wherein each of the plurality of reflected light pulses is detected using a predefined sampling period.

16. The method of claim 15, wherein the predefined sampling period is between 100 ns and 75 µs.

17. The method of claim 1, wherein each of the plurality of detection signals is, relative to the basis of the timescale, delayed by a respective time increment that has no integer multiple relationship to respective time increments by which remaining ones of the plurality of detection signals are delayed relative to the basis of the timescale.

18. The method of claim 1, wherein the step of emitting the succession of sampling light pulses comprises emitting a predetermined first number of sampling light pulses each with a first same delay and emitting a predetermined second number of sampling light pulses each with a second same delay that is different than the first same delay, wherein the step of generating the plurality of detection signals comprises generating a first plurality of detection signals that each correspond to a respective one of a first plurality of reflected light pulses that is detected as a result of a reflection of one of the predetermined first number of sampling light pulses, wherein the step of generating the plurality of detection signals further comprises generating a second plurality of detection signals that each correspond to a respective one of a second plurality of reflected light pulses that is detected as a result of a reflection of one of the predetermined second number of sampling light pulses, and further comprising the step of generating a first average detection signal by averaging over the first plurality of detection signals and generating a second average detection signal by averaging over the second plurality of detection signals, and wherein the combined signal corresponds to a superposition of the first and second average detection signals.

19. The method of claim 1, wherein the basis for the timescale is the at least one trigger point.

20. The method of claim 1, wherein the basis for the timescale is the clock signal.

21. An optical time domain reflectometer for determining a position of an irregularity in an optical transmission fiber, the optical time domain reflectometer comprising:
  a light source configured for emitting a succession of sampling light pulses into the optical transmission fiber, wherein the sampling light pulses have a predefined pulse width;
  a light receiver configured for detecting each of a plurality of reflected light pulses that each result from a reflection of a respective one of the sampling light pulses that occurs at the irregularity in the optical transmission fiber and for generating a plurality of detection signals that each correspond to a respective one of the detected plurality of reflected light pulses, wherein each detection signal is active for a time corresponding to the predefined pulse width;
  a processing unit operatively connected to the light receiver and configured for obtaining a combined signal from the plurality of detection signals;
  an analyzing unit operatively connected to the processing unit and configured for analyzing the combined signal to determine the position of the irregularity in the optical transmission fiber with respect to the optical time domain reflectometer based on a time shift between the combined signal and a calibration signal;
  wherein the processing unit is further configured for obtaining the combined signal from a superposition of the plurality of detection signals;
  wherein the generation by the light receiver of each of the plurality of detection signals is time-dependent relative to a timescale;
  wherein a basis for the timescale comprises at least one of:
    a clock signal comprising a regular clock signal cycle,
    at least one trigger point;
  wherein at least one of the plurality of detection signals is delayed, relative to the basis of the timescale, by an amount of delay that differs from an amount by which at least one other of the plurality of detection signals is delayed relative to the basis of the timescale;
  wherein the calibration signal is obtained by the steps of:
    emitting into the optical transmission fiber a succession of calibration light pulses;
    detecting a plurality of reflected calibration light pulses that each result from a reflection of a respective one of the emitted calibration light pulses that occurs at a test irregularity located at a known distance from the optical time domain reflectometer;

generating a plurality of calibration detection signals that each correspond to a respective one of the plurality of detected reflected calibration light pulses;

generating the calibration signal using a superposition of the plurality of calibration detection signals.

22. The optical time domain reflectometer of claim 21, further comprising a control unit operatively connected to the light source and configured for controlling the light source.

23. The optical time domain reflectometer of claim 22, wherein at least one of the processing unit and the control unit comprise at least one of an analog/digital converter and a digital/analog converter.

24. The optical time domain reflectometer of claim 22, wherein an integrated device comprises the processing unit, the analyzing unit, and the control unit.

25. The optical time domain reflectometer of claim 21, further comprising an optical component assembly and a connector, wherein the connector is configured for connecting the optical time domain reflectometer to an optical transmission fiber and wherein the optical component assembly is configured for:

directing, towards the connector, light pulses coming from the light source; and directing, towards the light receiver, light pulses coming from the connector.

26. The optical time domain reflectometer of claim 21, wherein the basis for the timescale is the clock signal.

27. The optical time domain reflectometer of claim 21, wherein the basis for the timescale is the at least one trigger point.

* * * * *